(12) United States Patent
Bengtzohn et al.

(10) Patent No.: US 12,114,597 B2
(45) Date of Patent: Oct. 15, 2024

(54) MULTI-POSITION LOCKING MECHANISM FOR A RIDING LAWN CARE VEHICLE

(71) Applicant: Husqvarna AB, Huskvarna (SE)

(72) Inventors: Johan Bengtzohn, Tenhult (SE); Mats Axelsson, Lekeryd (SE); David Klasson, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 968 days.

(21) Appl. No.: 17/051,547

(22) PCT Filed: May 31, 2019

(86) PCT No.: PCT/IB2019/054550
§ 371 (c)(1),
(2) Date: Oct. 29, 2020

(87) PCT Pub. No.: WO2020/053670
PCT Pub. Date: Mar. 19, 2020

(65) Prior Publication Data
US 2021/0219495 A1    Jul. 22, 2021

Related U.S. Application Data

(60) Provisional application No. 62/731,136, filed on Sep. 14, 2018.

(51) Int. Cl.
*A01D 34/66* (2006.01)
*A01D 34/64* (2006.01)
(Continued)

(52) U.S. Cl.
CPC .......... *A01D 34/662* (2013.01); *A01D 34/64* (2013.01); *A01D 42/00* (2013.01); *A01D 67/005* (2013.01);
(Continued)

(58) Field of Classification Search
CPC ............ A01D 34/661; A01D 2034/645; A01D 34/662; A01D 34/66
See application file for complete search history.

(56) References Cited

U.S. PATENT DOCUMENTS 1,881,497 A * 10/1932 Gooch, Jr. ................ A24B 5/06
131/321
4,035,995 A    7/1977 Arnblock
(Continued)

FOREIGN PATENT DOCUMENTS

FR            2887396 A1 * 12/2006    ........... A01D 34/661
WO    WO-2013016196 A1 *  1/2013    ........... A01D 34/001
(Continued)

OTHER PUBLICATIONS

International Search Report and Written Opinion for International Application No. PCT/IB2019/054550 mailed Nov. 4, 2019.

*Primary Examiner* — Adam J Behrens
*Assistant Examiner* — Ashley A Kaercher
(74) *Attorney, Agent, or Firm* — Burr & Forman LLP

(57) ABSTRACT

A latching assembly (100', 100") for operably coupling a cutting deck (50) to an equipment frame (60) of a riding lawn care vehicle (10) may include a pivot arm (300, 400), and a latch member (310, 410). The pivot arm (300, 400) and the latch member (310, 410) may each be pivotally coupled to each other. The pivot arm (300, 400) and the latch member (310, 410) may also cooperate with each other to affix the cutting deck (50) to the equipment frame (60) in each of a service position and a working position.

18 Claims, 17 Drawing Sheets

(51) Int. Cl.
*A01D 42/00* (2006.01)
*A01D 67/00* (2006.01)
*A01D 101/00* (2006.01)

(52) U.S. Cl.
CPC ........ *A01D 2034/645* (2013.01); *A01D 34/66* (2013.01); *A01D 2101/00* (2013.01)

(56) References Cited

U.S. PATENT DOCUMENTS

| | | | | |
|---|---|---|---|---|
| 4,292,982 A * | 10/1981 | Butcher | ................... | A24B 5/00 460/123 |
| 4,442,660 A * | 4/1984 | Kuhn | ................... | A01D 34/662 56/15.9 |
| 4,487,006 A * | 12/1984 | Scag | ................... | A01D 34/662 56/14.7 |
| 4,563,019 A * | 1/1986 | Kuhn | ................... | A01B 59/048 280/481 |
| 4,760,686 A * | 8/1988 | Samejima | ............... | A01D 34/74 56/15.8 |
| 4,809,489 A * | 3/1989 | Johansson | ............... | A01D 34/64 56/14.7 |
| 4,934,130 A * | 6/1990 | Johansson | ............... | A01D 34/64 56/6 |
| 5,079,907 A * | 1/1992 | Sameshima | .......... | A01D 43/063 56/15.9 |
| 5,343,680 A * | 9/1994 | Reichen | ................. | A01D 34/62 56/294 |
| 5,355,664 A * | 10/1994 | Zenner | ................... | A01D 34/82 56/15.8 |
| 5,816,035 A * | 10/1998 | Schick | ................... | A01D 34/74 56/15.8 |
| 5,927,055 A * | 7/1999 | Ferree | ................... | A01D 34/662 56/16.3 |
| 6,347,503 B1 * | 2/2002 | Esau | ...................... | A01D 34/64 56/15.9 |
| 6,393,815 B1 * | 5/2002 | Funk | ................... | A01D 34/662 56/320.2 |
| 7,451,586 B1 * | 11/2008 | Papke | ................... | A01D 34/662 56/15.9 |
| 8,091,329 B2 | 1/2012 | Schick | | |
| 9,642,297 B2 | 5/2017 | Nordquist | | |
| 10,561,064 B2 * | 2/2020 | Hoffman | ............... | A01D 34/662 |
| 10,779,467 B2 * | 9/2020 | Skoog | ................... | A01D 34/82 |
| 10,827,664 B2 * | 11/2020 | Simpson | ............... | A01D 34/662 |
| 2001/0037634 A1 * | 11/2001 | Schick | ................. | A01D 34/662 56/15.9 |
| 2002/0194826 A1 * | 12/2002 | Schick | ................. | A01D 34/662 56/15.9 |
| 2005/0016143 A1 * | 1/2005 | Thatcher | ............... | A01D 34/74 56/15.6 |
| 2006/0168929 A1 * | 8/2006 | Phillips | ................ | A01D 75/306 56/7 |
| 2007/0051083 A1 * | 3/2007 | Lilliestielke | ......... | A01D 34/662 56/15.2 |
| 2007/0187118 A1 | 8/2007 | Belanger | | |
| 2008/0245044 A1 * | 10/2008 | Shick | ..................... | A01D 34/74 56/14.9 |
| 2009/0100817 A1 * | 4/2009 | Godfrey | ............... | A01D 34/662 56/14.7 |
| 2010/0011733 A1 * | 1/2010 | Godfrey | ............... | A01D 34/662 56/17.5 |
| 2012/0266580 A1 * | 10/2012 | Ulmefors | ............. | A01D 34/863 56/15.9 |
| 2014/0083069 A1 * | 3/2014 | Berglund | ............. | A01D 34/64 56/14.7 |
| 2014/0083070 A1 * | 3/2014 | Berglund | ............. | A01D 34/661 56/14.7 |
| 2015/0107212 A1 * | 4/2015 | Iida | ........................ | A01D 34/64 56/320.1 |
| 2015/0181796 A1 * | 7/2015 | Nordquist | ............ | A01D 34/662 37/243 |
| 2016/0037717 A1 * | 2/2016 | Giere | .................... | A01D 34/74 56/320.1 |
| 2016/0050847 A1 * | 2/2016 | Bartel | ................... | A01D 34/64 56/15.2 |
| 2019/0111812 A1 * | 4/2019 | Stover | ................... | B62D 27/04 |
| 2019/0116729 A1 * | 4/2019 | Skoog | ................... | A01D 43/063 |
| 2020/0068801 A1 * | 3/2020 | Bengtzohn | .......... | A01D 34/662 |
| 2020/0267886 A1 * | 8/2020 | Simpson | ............. | A01D 34/662 |
| 2021/0059116 A1 * | 3/2021 | Laurin | ................. | A01D 34/661 |
| 2021/0219495 A1 * | 7/2021 | Bengtzohn | .......... | A01D 67/005 |
| 2021/0259154 A1 * | 8/2021 | Rinholm | ............... | A01D 75/30 |
| 2021/0352846 A1 * | 11/2021 | Clontz | ................... | A01D 34/74 |
| 2022/0071087 A1 * | 3/2022 | Nebel | ................... | A01D 34/66 |
| 2022/0183223 A1 * | 6/2022 | Svensson | ............. | A01D 34/008 |

FOREIGN PATENT DOCUMENTS

| | | | | |
|---|---|---|---|---|
| WO | 2014029449 A1 | 2/2014 | | |
| WO | WO-2017208049 A1 * | 12/2017 | ............. | A01D 34/49 |

* cited by examiner

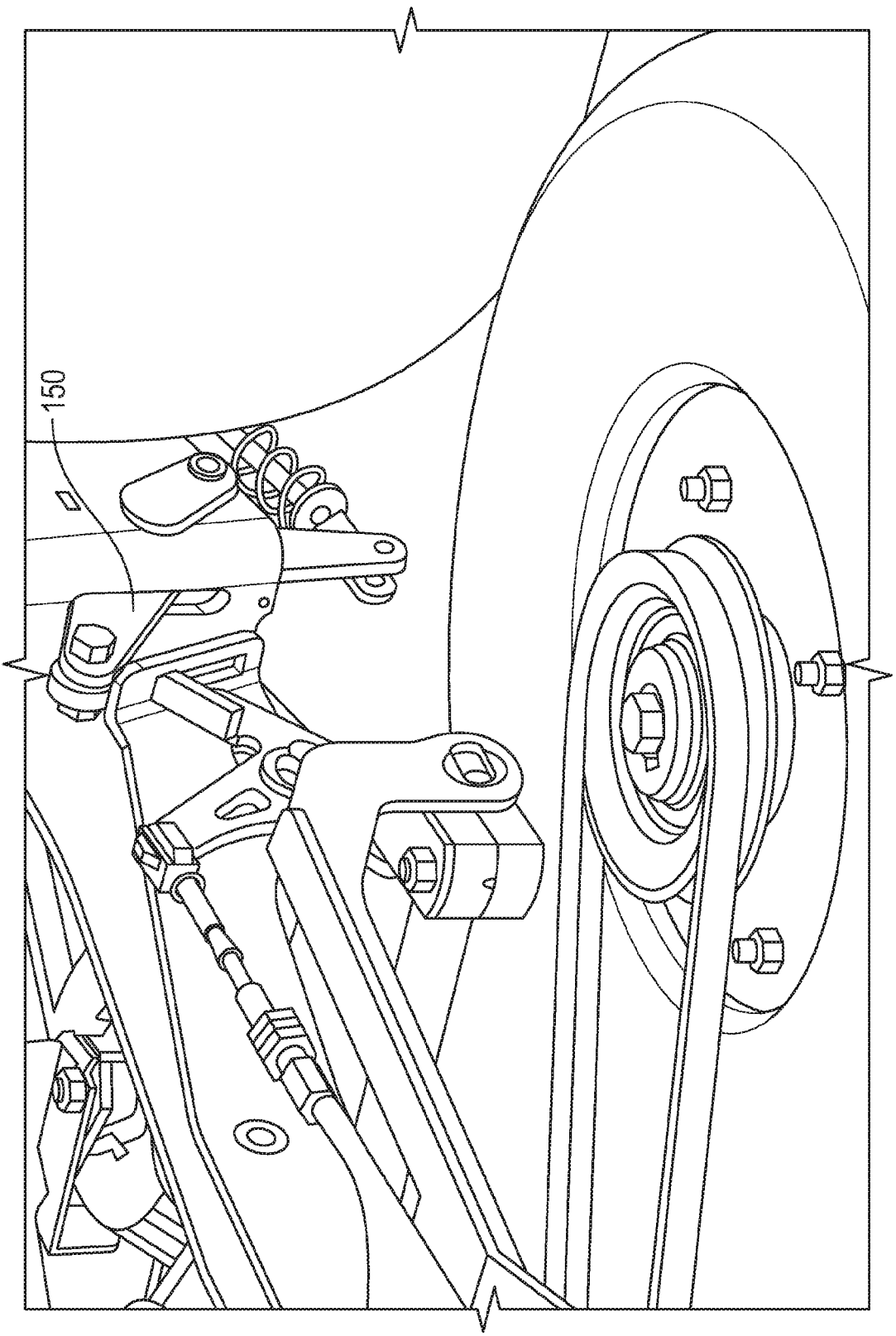

MULTI-POSITION LOCKING MECHANISM FOR A RIDING LAWN CARE VEHICLE

CROSS REFERENCE TO RELATED APPLICATIONS

This application claims priority to U.S. application No. 62/731,136 filed Sep. 14, 2018, the entire contents of which are hereby incorporated by reference in its entirety.

TECHNICAL FIELD

Example embodiments generally relate to lawn care vehicles with a removable cutting deck and, more particularly, relate to a locking mechanism supporting multiple positions for an equipment frame for such a lawn care vehicle.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. Riding lawn mowers provide the convenience of a riding vehicle as well as a typically larger cutting deck as compared to a walk-behind model. Similarly, riding lawn care vehicles typically provide users with increased convenience by enabling them to perform the yard maintenance tasks faster without exerting effort to push or walk with a vehicle. Furthermore, riding lawn care vehicles can sometimes be configured with various functional accessories (e.g., trailers, tillers, plows, snow blower attachments, lawn cutting blade attachments, bagging attachments and/or the like) to enable them to tackle numerous different tasks depending on the accessories added thereto.

As can be appreciated from the description above, riding lawn care vehicles may come in many different sizes and may have wide variances in their capabilities. However, beyond mere changes in size and function, riding lawn care vehicles can also be produced with a great deal of variation in relation to the configurations via which various ones of the functions they can perform are provided. For example, some riding yard maintenance vehicles may have attachments that are rear mounted, front mounted, or even mounted between the front and rear wheels. The many possible variations in configuration may enable designers to produce specific device configurations that are able to excel in certain difficult operating environments. However, with regard to these different possible configurations and attachments, one common concern is the case and convenience of shifting between configurations.

BRIEF SUMMARY OF SOME EXAMPLES

Accordingly, some example embodiments may provide a structure for employment in connection with a riding lawn care vehicle to which accessories are mounted. In this regard, some example embodiments may provide an improved locking mechanism for an equipment frame, which allows an accessory to be mounted and retained in multiple positions, such as a working position and a service position, with relative ease and convenience. As such, the structure of some example embodiments may allow for a relatively straight forward process to attach or remove the cutting deck or to shift the cutting deck into a service position.

For example, in one embodiment of the invention, a riding lawn care vehicle is provided. The riding lawn care vehicle may include a vehicle frame, a mobility assembly operably coupled to the vehicle frame, an equipment frame operably coupled to the vehicle frame such that the equipment frame extends forward of the mobility assembly, a steering assembly operably coupled to the mobility assembly to enable an operator positioned on the riding lawn care vehicle to provide steering control of the riding lawn care vehicle, a removable cutting deck comprising a cutting blade and configured to be alternately connected and disconnected relative to the equipment frame, and a latching assembly. The latching assembly may be configured to enable the cutting deck to be transitioned between a service position and a working position and affix the cutting deck to the equipment frame in each of the service position and the working position.

In another example embodiment, a latching assembly for operably coupling a cutting deck to an equipment frame of a riding lawn care vehicle is provided. The latching assembly may include a pivot arm and a latch member. The pivot arm and the latch member may be pivotally coupled to each other. The pivot arm and the latch member may also cooperate with each other to affix the cutting deck to the equipment frame in each of a service position and a working position.

Some example embodiments may improve an operator's ability to employ a front mounted model of a lawn care vehicle to accomplish various yard maintenance activities. The user experience associated with changing configurations and conducting cleaning or maintenance on the riding lawn care vehicle may also be improved.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 1:
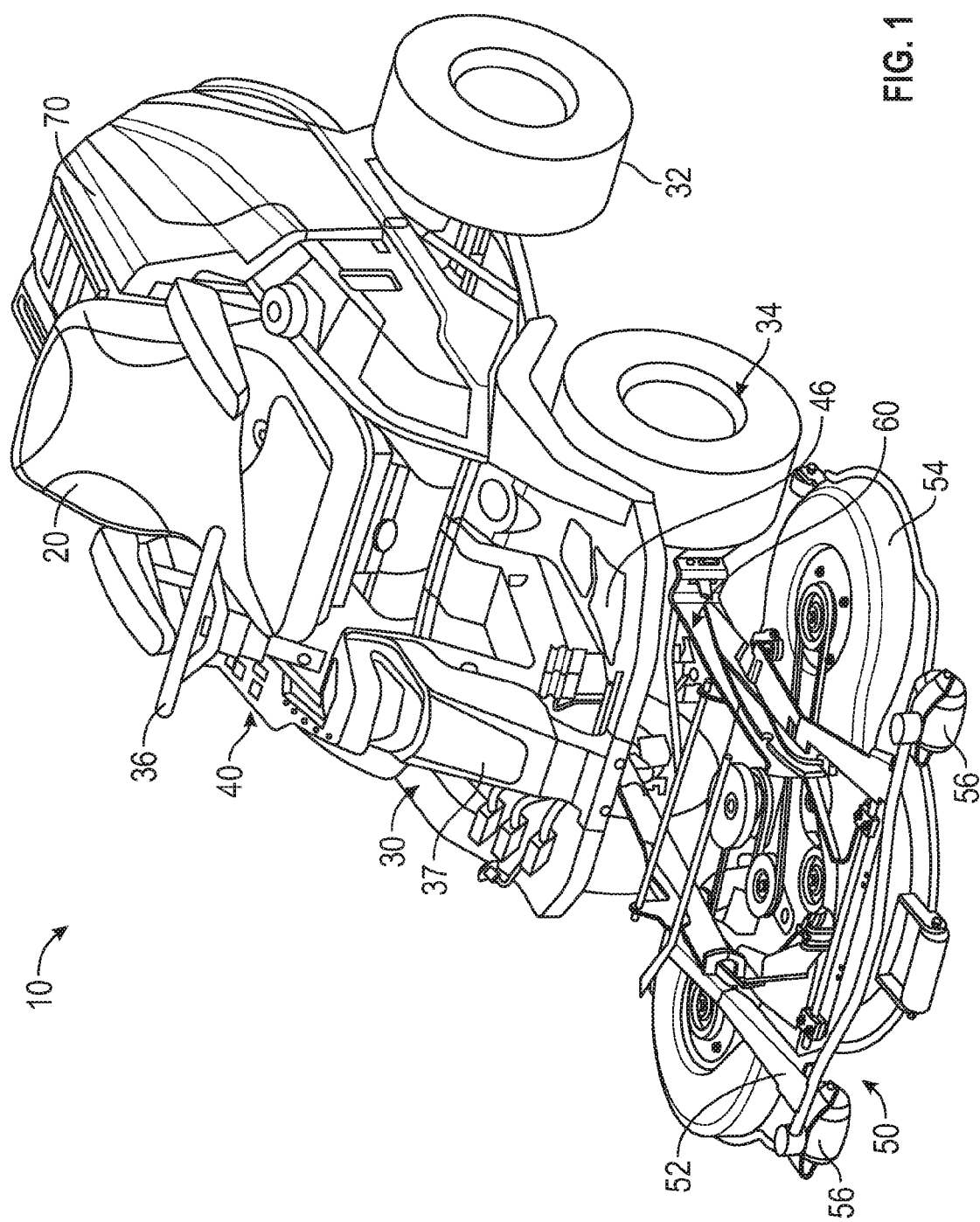
FIG. 1 illustrates a perspective view of a front mount riding lawn care vehicle according to an example embodiment.
Figure 2:
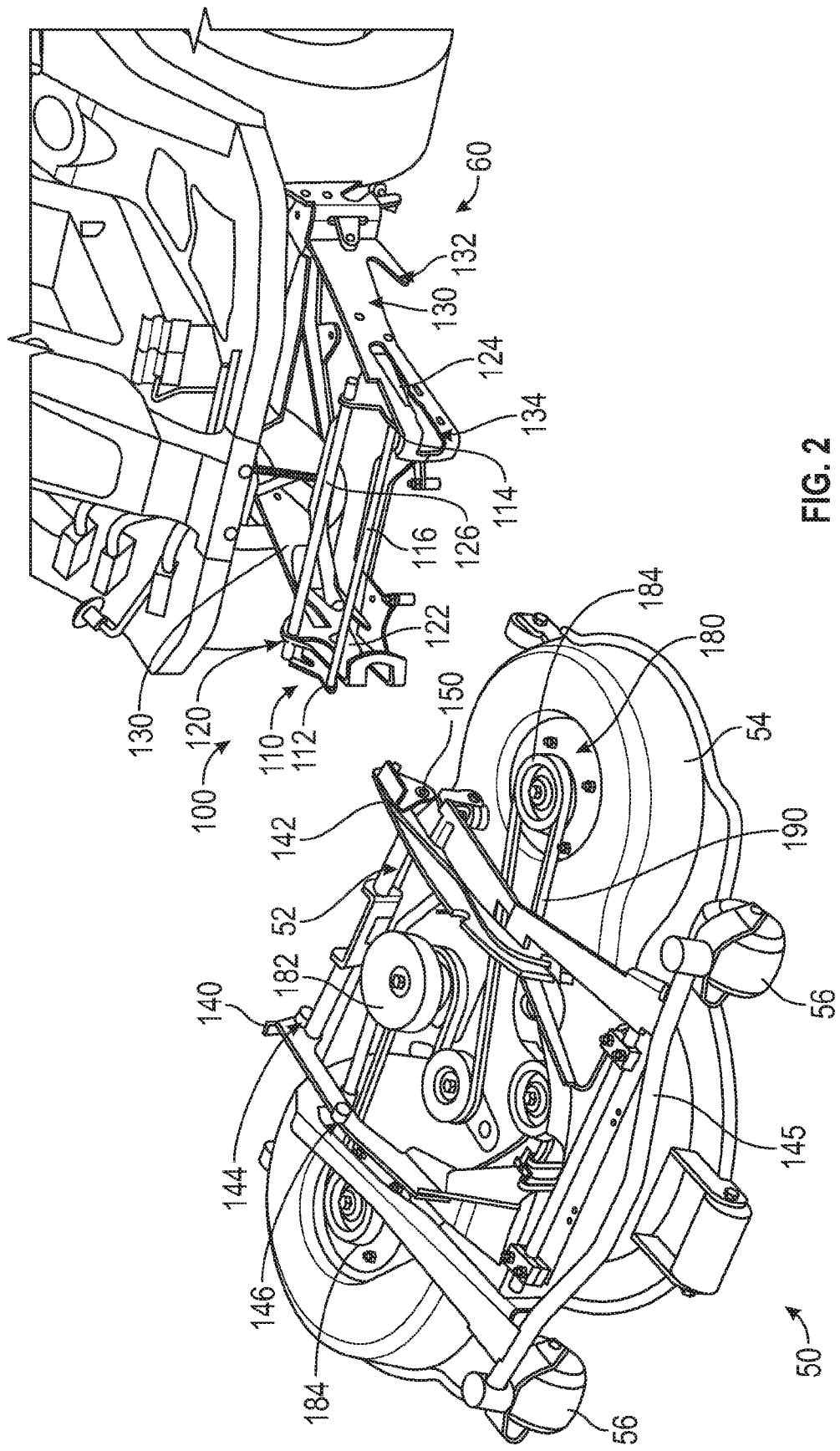
FIG. 2 illustrates a perspective view of the riding lawn care vehicle of FIG. 1 with a cutting deck removed according to an example embodiment.
Figure 3A:
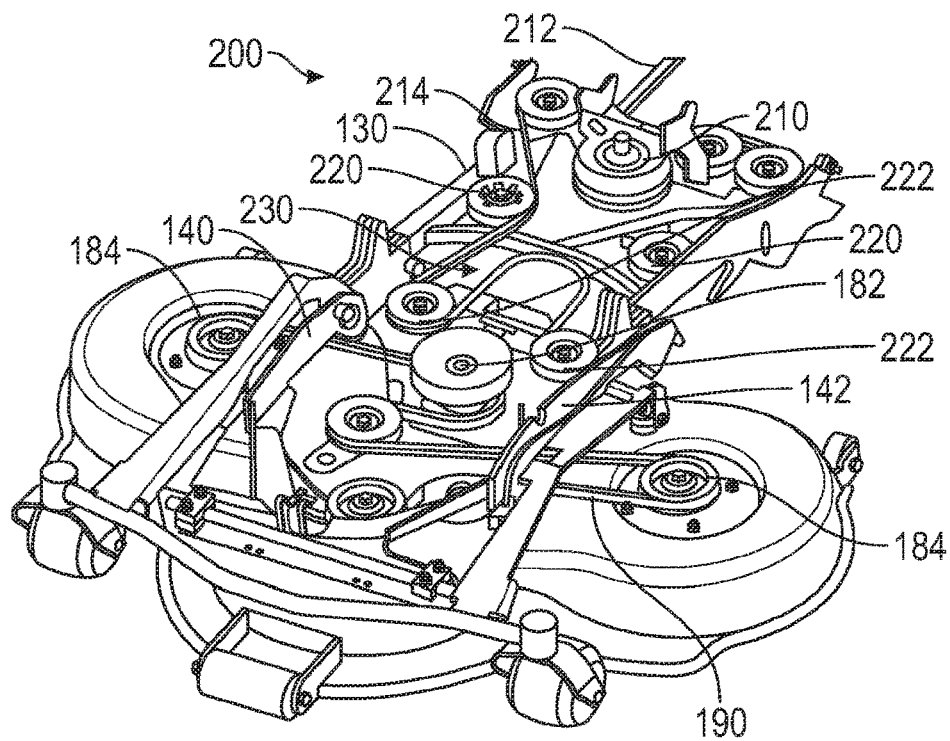
Figure 3B:
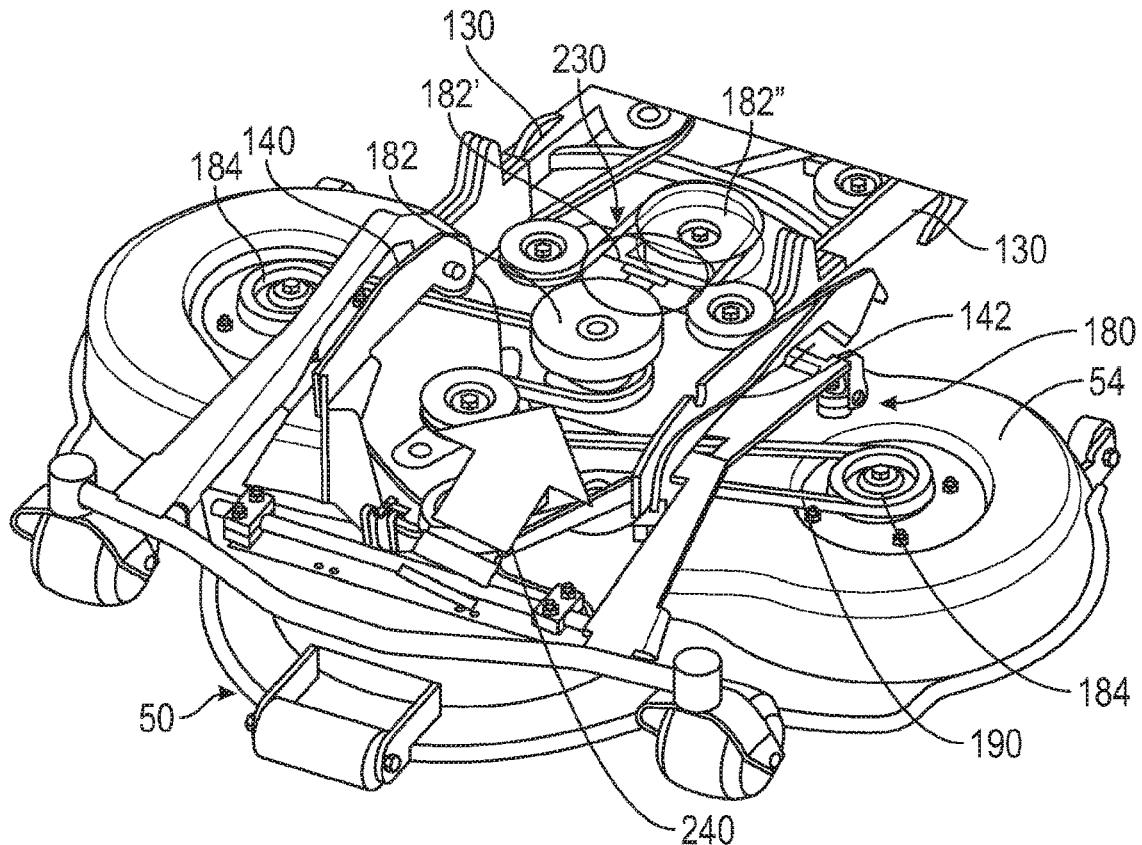
Figure 3C:
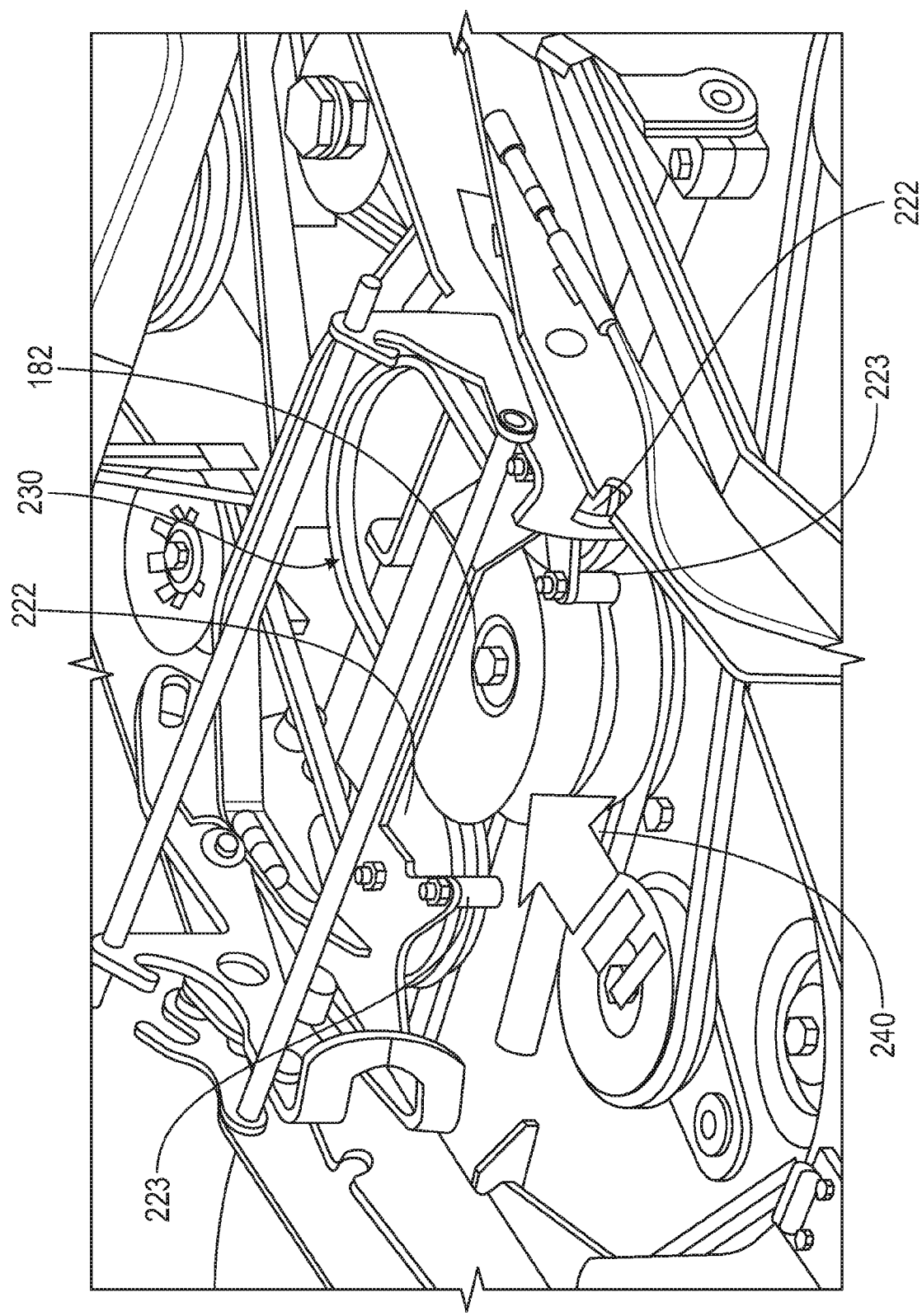
Figure 4:
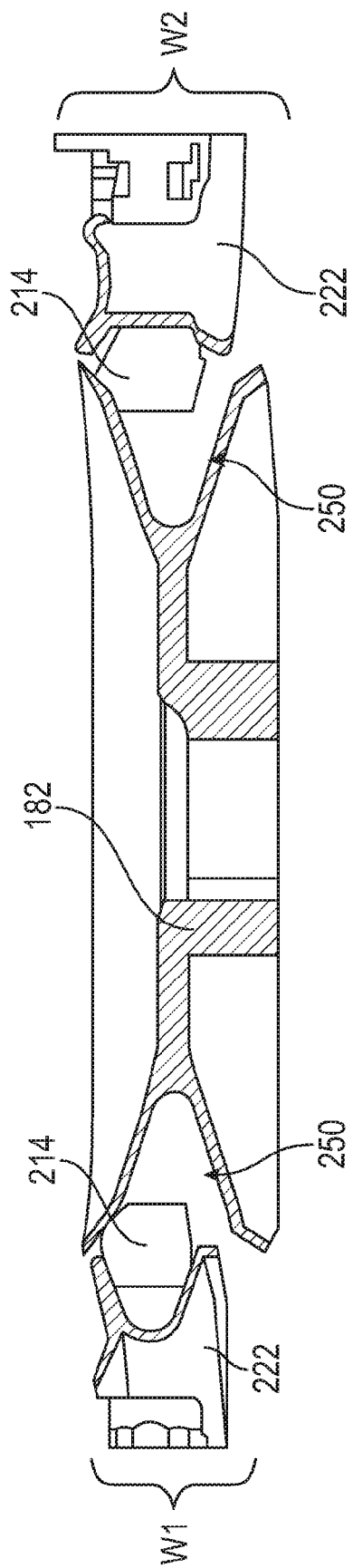

FIG. 3, which is defined by FIGS. 3A, 3B and 3C, illustrates a perspective view of the cutting deck of FIGS. 1 and 2 along with portions of the riding lawn care vehicle to illustrate structures associated with mating the cutting deck to an equipment frame of the riding lawn care vehicle according to an example embodiment;

FIG. 4 illustrates a cross section view of some pulley wheels of a belt positioning system according to an example embodiment;

FIG. 5, which is defined by FIGS. 5A, 5B, 5C, and 5D, illustrates various components of a weight transfer assembly in accordance with one example embodiment;

FIG. 6, which is defined by FIGS. 6A, 6B, 6C, 6D, 6E, 6F and 6G, illustrates a latching assembly and its operation for the transitioning of the cutting deck between the operational position and the service position in accordance with an example embodiment;

FIG. 7, which is defined by FIGS. 7A, 7B, 7C, 7D, and 7E, illustrates another latching assembly and its operation for the transitioning of the cutting deck between the operational position and the service position in accordance with an example embodiment;

FIG. 8, which is defined by FIGS. 8A, 8B, 8C and 8D, illustrates perspective views of the riding lawn care vehicle with the cutting deck in various positions including the service position (FIGS. 8A and 8B), the working position (FIG. 8C), and a position immediately preceding rotation of the cutting deck into the service position (FIG. 8D) in accordance with an example embodiment; and FIG. 9 illustrates a perspective view of a height adjustment assembly according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "lawn care" is meant to relate to any yard maintenance activity and need not specifically apply to activities directly tied to grass, turf or sod care. As used herein, operable coupling should be understood to relate to direct or indirect connection that, in either case, enables functional interconnection of components that are operably coupled to each other. Although terms such as equipment, attachment, accessory and/or the like may each be used generally and interchangeably to describe components of various devices, some of these terms may be used to differentiate certain components of example embodiments for purposes of clarity.

Some example embodiments may improve operator comfort, case of maintenance, operability, and overall device utility of lawn care vehicles such as, for example, riding lawn mowers with an equipment frame that is front mounted. In this regard, FIG. 1 illustrates a perspective view of a riding lawn care vehicle 10 that includes a front mounted equipment frame according to an example embodiment. FIGS. 2-9 illustrate various additional views of components or portions of the riding lawn care vehicle 10 according to an example embodiment. Although FIGS. 1-9 show a front mounted model, it is also possible for example embodiments to be practiced in connection with rear-mounted attachments, or attachments mounted (using the structures described herein) to any other portion of the riding lawn care vehicle 10.

FIG. 1 illustrates a riding lawn care vehicle 10 that may include a seat 20 that may be disposed at a center, rear or front portion of the riding lawn care vehicle 10. Terms such as front, forward, rear and rearward, should generally be understood to be considered relative to the normal driving direction of the riding lawn care vehicle 10 and direction the operator faces. The operator faces forward and toward the front of the riding lawn care vehicle 10 during normal operation in the normal driving direction. The riding lawn care vehicle 10 may also include a steering assembly 30 (e.g., a steering wheel, handle bars, joystick(s) or the like) operably coupled to rear wheels 32 of the riding lawn care vehicle 10 to allow the operator to steer the riding lawn care vehicle 10 via steering inputs that are communicated to the rear wheels 32. Since steering control is provided to the rear wheels 32, the front wheels 34 may not receive steering inputs in some embodiments. However, it may be possible to reverse the arrangement described above such that the front wheels 34 receive steering inputs and the rear wheels 32 do not in alternative embodiments. Regardless of the steering paradigm employed, the operator may sit on the seat 20, which may be disposed to the rear of the steering assembly 30 to provide input for steering of the riding lawn care vehicle 10 via the steering assembly 30. Additionally, although this example shows a mobility assembly including wheels (e.g., front wheels 34 and rear wheels 32), it is also possible for the mobility assembly to include tracks. In either case, the mobility assembly may be operably coupled to a frame (see vehicle frame 262 of FIG. 5A), which supports the mobility assembly and other components of the riding lawn care vehicle 10.

In an example embodiment, the steering assembly 30 may include a steering wheel 36 and a steering column 37. The steering column 37 may operably couple the wheels to which steering inputs are provided to communicate steering inputs inserted at the steering wheel 36 to (in this case) the rear wheels 32 via mechanical and/or electrical connections. The riding lawn care vehicle 10 may also include additional control related components that may be disposed at a control panel 40. The control related components may include levers, buttons, switches and/or the like configured to provide control over certain functions or components such as a blade speed adjuster, a choke control, a cutting height adjuster and/or a cutting unit controller. In some embodiments, one or more additional controllers, may be provided in the form of foot pedals that may sit proximate to a footrest 46 (which may include a portion on both sides of the riding lawn care vehicle 10 (e.g., on opposite sides of the steering column 37)) to enable the operator to rest his or her feet thereon while seated in the seat 20. These foot pedals may provide speed control for forward and/or rearward operation, braking, cutting deck lifting or other functions.

In some example embodiments, the steering assembly 30 may be embodied as an assembly of metallic or other rigid components that may be welded, fitted, bolted or otherwise operably coupled to each other and coupled to the wheels (rear wheels 32 in this example) of the riding lawn care vehicle 10 to which steering inputs are provided. For example, the steering assembly 30 may include or otherwise be coupled with a steering cable assembly or a system of mechanical linkages (e.g., pulleys, tie rods, cams, and/or other mechanical components) to translate rotational motion applied to the steering assembly 30 (and more particularly to the steering wheel 36) into directional inputs to orient the wheels accordingly. Other steering control systems may be employed in some alternative embodiments.

The riding lawn care vehicle 10 may also include, or be configured to support attachment of, a cutting deck 50 having at least one cutting blade mounted therein. The cutting deck 50 may be a removable attachment that may be positioned in front of the front wheels 34 in a position to enable the operator to cut grass using the cutting blade when the cutting blade is rotated below the cutting deck 50 and the cutting deck 50 is in a cutting position. When operating to cut grass, some example embodiments may provide that the grass clippings may be captured by a collection system, mulched, or expelled from the cutting deck 50 (e.g., via a discharge that may be directed to a side or rear of the cutting deck 50 and/or riding lawn care vehicle 10).

The cutting deck 50 may include an attachment frame 52 to which a housing 54 and caster wheels 56 (and/or other supporting wheels) are attached. The cutting deck 50 may also include a cover (not shown) that may cover some portions of the attachment frame 52 and/or the housing 54 to protect such components or to improve the aesthetic appearance of the cutting deck 50. The attachment frame 52 may be connectable to an equipment frame 60 of the riding lawn care vehicle 10. The equipment frame 60 may be attached to a frame (e.g., the vehicle frame 262 of FIG. 5A) of the riding lawn care vehicle 10 at a front portion of the riding lawn care vehicle 10. In some cases, the equipment frame 60 may extend forward from a portion of the riding lawn care vehicle 10 that is between the front wheels 34. The attachment frame 52 may therefore be alternately connected to and disengaged from the equipment frame 60 to create two distinct states for the riding lawn care vehicle 10, namely a connected state and a disconnected state. Meanwhile, as will be discussed in greater detail below, the connected state may have two further states or positions including an operational position and a service position.

In some embodiments, the cutting deck 50 may be replaced by other working attachments to change the configuration of the riding lawn care vehicle 10 and correspondingly change the tasks that may be performed by the riding lawn care vehicle 10. Thus, for example, a plow blade or snow blower attachment may be provided to convert the riding lawn care vehicle 10 into a snow removal device. Alternatively, a tiller attachment may be provided to convert the riding lawn care vehicle 10 into a ride-on or remote control operable tiller. Other attachments and configurations are also possible such as, for example, brush cutter attachments, utility bucket attachments, flail mower attachments, snow thrower attachments, broom attachments, blower attachments, folding plough attachments, and/or the like. These attachments may, in some cases, be or further include working assemblies (e.g., a cutting deck may include a blade as a working assembly). In each case, the attachment frame 52 may be disengaged from the equipment frame 60 to place the riding lawn care vehicle 10 in the disconnected state. Thereafter, one of the other attachments may be attached to the equipment frame 60 to place the riding lawn care vehicle 10 in a connected state relative to the one of the other attachments.

In the pictured example embodiment of FIG. 1, an engine of the riding lawn care vehicle 10 is disposed in an engine compartment 70 that is behind a seated operator in a rear portion of the riding lawn care vehicle 10. However, in other example embodiments, the engine could be in different positions such as in front of or below the operator, and the operator may be standing at a stand-on operator location. In some embodiments, the engine may be operably coupled to one or more of the wheels of the riding lawn care vehicle 10 in order to provide drive power for the riding lawn care vehicle 10. In some embodiments, the engine may be capable of powering two wheels, while in others, the engine may power all four wheels of the riding lawn care vehicle 10. Moreover, in some cases, the engine may manually or automatically shift between powering either some wheels or all four wheels of the riding lawn care vehicle 10. The engine may be a petrol engine, or may be replaced by an electric motor in some cases.

The engine, the steering assembly 30, the cutting deck 50, the seat 20 and other components of the riding lawn care vehicle 10 may be operably coupled to the frame of the riding lawn care vehicle 10. The frame may be a rigid structure configured to provide support, connectivity and interoperability functions for various ones of the components of the riding lawn care vehicle 10. In some embodiments, the frame may be split or articulated such that, for example, the front wheels 34 are disposed on an opposite portion of the frame than the portion of the frame on which the rear wheels 32 are disposed with respect to an articulated joint in the frame. In some embodiments, the articulated joint may form a linkage arrangement that may, in some cases, be referred to as a "dog-bone" articulated arrangement.

Referring now to FIG. 2, in which the riding lawn care vehicle 10 is shown in the disconnected state, various components of the cutting deck 50 and equipment frame 60 will be discussed. As shown in FIG. 2, the equipment frame 60 may include a latching assembly 100 configured to enable operably coupling the attachment frame 52 to the equipment frame 60 in either the service position or the operational position. Thus, in some cases, the latching assembly 100 may include separate latches or structural assemblies for each respective position. However, the latching assembly 100 could alternatively include one structural assembly that accomplishes both tasks. In the example of FIG. 2, the latching assembly 100 includes a service lock latch 110 configured to operably couple the attachment frame 52 to the equipment frame 60 in the service position (e.g., for cleaning or maintenance on components of the cutting deck 50) and an equipment lock latch 120 configured to operably couple the attachment frame 52 to the equipment frame 60 in the operational position (e.g., for cutting grass via the blades inside the cutting deck 50).

The latching assembly 100 may be operably coupled to guide rails 130 that form a portion of the equipment frame 60. The guide rails 130 may be operably coupled to the frame of the riding lawn care vehicle 10 forward of and between the front wheels 34. The guide rails 130 may, in some cases, extend substantially parallel to each other and substantially parallel to a longitudinal centerline of the riding lawn care vehicle 10. In some cases, the guide rails 130 may also extend substantially parallel to the ground surface. The guide rails 130 may be formed from sheet metal or metallic bars and may, in some cases, be operably coupled to each other via cross members. The cross members may provide structural support to the guide rails 130 and, in some cases, may provide positioning services relative to belt guiding or alignment as discussed in greater detail below.

In an example embodiment, each of the guide rails 130 may include a respective instance of a guide slot 132 and a positional adjustment slot 134. The guide slot 132 may be located rearward of the positional adjustment slot 134 along the length of the guide rails 130. In some cases, the guide slot 132 may have a generally V shape with a wider open end and a relatively narrow apex. The V shape may be opened or oriented in the forward direction, and may be disposed on a bottom side of the guide rail 130 to open generally forward and slightly downward. The positional adjustment slot 134 may be disposed from a distal end of the guide rail 130 and extend along a longitudinal length of the guide rail 130 toward a longitudinal center of the guide rail 130. Both the service lock latch 110 and the equipment lock latch 120 may be disposed proximate to the positional adjustment slot 134.

The service lock latch 110 may include a first pivot member 112 and a second pivot member 114 along with a cross member 116 that extends between the first and second pivot members 112 and 114. In an example embodiment, the first and second pivot members 112 and 114 may be operably coupled to a top portion of respective opposing ones of the guide rails 130 at a pivot joint. In some cases, the first and second pivot members 112 and 114 may be operably coupled to the respective opposing ones of the guide rails 130 such that the first and second pivot members 112 and 114 are disposed outside of the guide rails 130. Thus, the pivot joint may allow the cross member 116 to alternately rest on top of the guide rails 130 or be pivoted away from the guide rails for transitioning to the service position as described in greater detail below.

The equipment lock latch 120 may include a first pivot arm 122 and a second pivot arm 124 along with a cross bar 126 that extends between the first and second pivot arms 122 and 124. In an example embodiment, the first and second pivot arms 122 and 124 may be operably coupled to a generally central portion of respective opposing ones of the guide rails 130 at a pivot joint. In some cases, the first and second pivot arms 122 and 124 may be operably coupled to the respective opposing ones of the guide rails 130 such that the first and second pivot arms 122 and 124 are disposed inside of the guide rails 130. Thus, the pivot joints of the first and second pivot arms 122 and 124 may allow the cross bar 126 to alternately be raised and lowered between the guide rails 130 to allow the cutting deck 50 to be joined to the equipment frame 60, removed therefrom, or be pivoted to the service position as described in greater detail below.

The attachment frame 52 may include a first rail 140 and a second rail 142 that are substantially parallel to each other, and spaced apart from each other by a distance. In some embodiments, that distance is either slightly more than or less than the distance that separates the guide rails 130. In the example of FIG. 2, the distance between the first and second rails 140 and 142 is slightly larger than the distance between the guide rails 130 so that, when aligned, the first and second rails 140 and 142 are configured to mate with outside edges of the guide rails 130. The inside facing sides of the first and second rails 140 and 142 may each include connection studs (e.g., a first set of connection studs 144 and a second set of connection studs 146) that face each other. When the guide rails 130 are aligned with the first and second rails 140 and 142 for mating of the equipment frame 60 and the attachment frame 52, the first set of connection studs 144 may ride into the guide slots 132 on the guide rails 130, while the second set of connection studs 146 ride into the positional adjustment slots 134 on the guide rails 130. Accordingly, the first set of connection studs 144 may be located at a lower elevation (relative to the ground) than the second set of connection studs 146 to allow the first set of connection studs 144 to pass underneath the distal ends of the guide rails 130 to reach the guide slots 132. The first connection studs 144 may rest in the guide slots 132 without any specific structure being employed to retain the first connection studs 144 in the guide slots 132. However, the second connection studs 146 may be retained in the positional adjustment slots 134 by the first and second pivot arms 122 and 124 in certain situations (as described in greater detail below).

The attachment frame 52 of the cutting deck 50 may be operably coupled to a housing frame 145 in such a way that allows cutting height adjustments to be made by altering the height of the cutting deck 50. For example, the attachment frame 52 may be rigidly mountable to the equipment frame 60 and the housing frame 145 may be rigidly mounted to the housing 54, but the housing frame 145 may be adjustably mounted relative to the attachment frame 52 based on operation of a height adjustment assembly 150. The height adjustment assembly 150 may be adjusted to alter a pivot point or multiple pivot points at which the housing frame 145 is operably coupled to the attachment frame 52. By changing the orientation of the housing frame 145 relative to the fixed height of the attachment frame 52, the relative height of the castor wheels 56 (which are carried on the housing frame 145) may be adjusted to correspondingly adjust cutting height. In an example embodiment, the height adjustment assembly 150 may be operated remotely by operation of a lever or other control operator disposed, for example, at the control panel 40. The lever may be operably coupled to the height adjustment assembly 150 via a Bowden cable or other flexible member via which forces may be transmitted.

The cutting deck 50 houses one or multiple blades in the housing 54, as mentioned above. The blade or blades are driven by a blade drive system 180 that includes a main blade drive pulley 182 (e.g., a double pulley having two wheels mounted to one shaft) and one or more other drive pulleys 184 that are operably coupled to the main blade drive pulley 182 by a blade drive belt 190. The blade drive belt 190 may be powered via the blade drive pulley 182 when the blade drive system 180 receives power from the riding lawn care vehicle 10. The power may then be transferred to the other drive pulleys 184, each of which turns a corresponding blade.

Attachment of the attachment frame 52 of the cutting deck 50 to the equipment frame 60 will now be described in reference to FIG. 3, which is defined by FIGS. 3A, 3B and 3C. FIG. 3A illustrates the cutting deck 50 immediately prior to connection to the equipment frame 60, while FIG. 3B illustrates the process of installation for automatic belt connection upon docking or mating of the cutting deck 50 with the equipment frame 60. FIG. 3C illustrates a closeup view of a belt positioning system 200 according to an example embodiment. FIG. 4 illustrates a cross section view of some pulleys of the belt positioning system 200 in accordance with an example embodiment.

A typical process for connecting a cutting deck to a riding lawn mower involves mechanically connecting the cutting deck to a portion of the frame of the mower, and then subsequently further requires the serpentine belt (or other flexible driving member) of the mower to be connected to the blade drive system of the cutting deck. The connection of the serpentine belt is typically a separate step that requires tools to perform. Example embodiments may eliminate the need for usage of tools in connection with coupling the belt to the cutting deck, and also eliminate attachment of the belt as a separate step since the belt connection is automatically performed by docking the cutting deck 50 with the equipment frame 60.

Referring to FIGS. 3 and 4, the belt positioning system 200 includes an arrangement of pulleys and other components that position a belt for automatic connection when the cutting deck 50 is mated with the equipment frame 60. As shown in FIG. 3A, a main drive pulley 210 (e.g., a double pulley having two wheels mounted to one shaft) may be operably coupled to a main drive belt 212 and an equipment drive belt 214 to transfer power provided from the engine of the riding lawn care vehicle 10 to the cutting deck 50 via the equipment drive belt 214. In this regard, power from the engine turns the main drive belt 212 and consequently also the main drive pulley 210, which transfers that power to the equipment drive belt 214. The equipment drive belt 214 is positioned via one or more other pulleys to be routed forward and inside of tensioning wheels 220 before being routed toward a longitudinal centerline and rearward by a set of guide wheels 222. In an example embodiment, the guide wheels 222 may be disposed between the guide rails 130. However, the guide wheels 222 may be at a lower elevation than the guide rails 130.

In some cases, guide posts 223 (see FIG. 3C) or other guiding apparatuses may be disposed proximate to the guide wheels 222 to ensure that the equipment drive belt 214 is routed around the guide wheels 222 and rearward to form a slack portion (when the cutting deck 50 is not connected) of the equipment drive belt 214 that acts as substantially U shaped receiving portion 230. During mating of the equipment frame 60 with the cutting deck 50, the blade drive pulley 182 of the cutting deck 50 may fit into the receiving portion 230 and engage with the equipment drive belt 214 without any need for user interaction to connect the equipment drive belt 214.

The receiving portion 230 may maintain the substantially U shape even when the cutting deck 50 is not mated with the equipment frame 60 so that the receiving portion 230 is poised and ready to receive the blade drive pulley 182 as either the cutting deck 50 is moved rearward toward the equipment frame 60 or the equipment frame 60 is moved forward toward the cutting deck 50 to mate the equipment frame 60 to the attachment frame 52. In this regard, the equipment drive belt 214 may be partially supported by cross members of the equipment frame and/or the rigidity of the belt may prevent sagging of the equipment drive belt 214 at the portion of the equipment drive belt 214 that forms the receiving portion 230.

Accordingly, when relative motion (shown by arrow 240 in FIG. 3B) between the cutting deck 50 and the equipment frame 60 occurs while the first and second rails 140 and 142 are substantially aligned with the guide rails 130, the blade drive pulley 182 will relatively move rearward through the position of the blade drive pulley 182' shown in FIG. 3B and ultimately into the receiving portion 230 at a final position of the belt drive pulley 182" also shown in FIG. 3B.

As can be appreciated from FIGS. 3B and 3C, the blade drive pulley 182 may move into a position substantially between the guide wheels 222 when the blade drive pulley 182 first achieves engagement with the equipment drive belt 214. Thereafter, the blade drive pulley 182 may move rearward of both of the guide wheels 222 to ultimately achieve engagement with the receiving portion 230 of the equipment drive belt 214 when the cutting deck 50 is fully mated with the equipment frame 60.

In order to account for any sagging that may occur in the equipment drive belt 214 at the portion of the equipment drive belt 214 that forms the receiving portion 230, the blade drive pulley 182 may be designed to improve belt capturing performance. In this regard, for example, FIG. 4 illustrates a cross section view taken through the axes of the guide wheels 222 while the blade drive pulley 182 is in the position shown in FIG. 3C. As can be seen in FIG. 4, a width (W1) of the guide wheels 222 may be less than a width (W2) of the blade drive pulley 182. However, top surfaces of the guide wheels 222 and the blade drive pulley 182 may be substantially coplanar. Thus, since W2>W1, the blade drive pulley 182 has a lower bottom surface than both of the guide wheels 222. The channel 250 formed in the belt wheel of the blade drive pulley 182 that engages the equipment drive belt 214 is also substantially V shaped. Thus, the lower elevation of the bottom of the channel 250, coupled with the shape that narrows to the apex of the V shape will allow the equipment drive belt 214 to be captured even if there is some sagging in the equipment drive belt 214 at the receiving portion 230.

Although the example described above illustrates one example structure for the latching assembly 100 in which the service lock latch 110 and the equipment lock latch 120 are operable to perform the functions of the latching assembly 100, it should be appreciated that the service lock latch 110 and the equipment lock latch 120 only form one example structure and other alternative structures could be employed in some cases. In this regard, while the service lock latch 110 and the equipment lock latch 120 each pivot with respect to different axes independent of each other, it may be possible to define additional or improved functionality for the latching assembly 100 by using a different structure. An example of such a structure will now be described in reference to FIGS. 5-8.

In particular, some example embodiments may not only allow for a relatively simple and easy way to attach and detach the cutting deck 50 from the equipment frame 60, but such example embodiments may further enable the cutting deck 50 to be retained under positive control both in the service position and the working position. Moreover, in some cases, the positive control may be ensured when a weight transfer function is being employed to transition to the service position, while the cutting deck 50 can otherwise be relatively easily removed from the equipment frame 60 when the weight transfer function is not being employed. In this regard, FIG. 5, which is defined by FIGS. 5A, 5B, 5C, and 5D, illustrates various components of a weight transfer assembly in accordance with one example embodiment. FIG. 6, which is defined by FIGS. 6A, 6B, 6C, 6D, 6E, 6F and 6G, illustrates a perspective view (FIG. 6A) and various side views of a latching assembly 100' of an example embodiment. FIG. 7, which is defined by FIGS. 7A, 7B, 7C, 7D, and 7E, illustrates a perspective view (FIG. 7A) and various side views of a latching assembly 100" of an alternative example embodiment. FIG. 8, which is defined by FIGS. 8A, 8B, 8C and 8D, illustrates various perspective views of the latching assembly 100' in contact with the cutting deck 50.

Figure 5A:
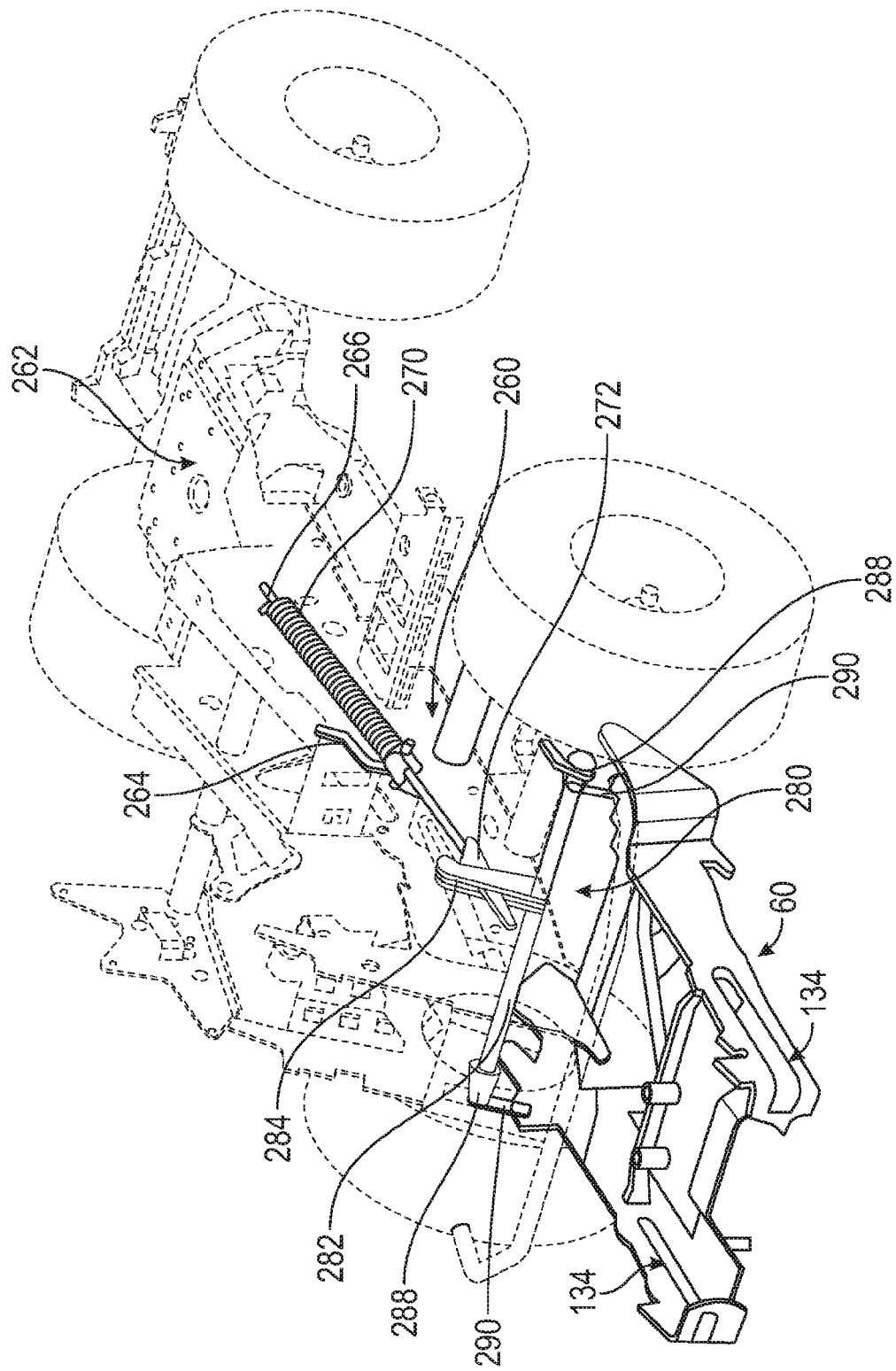
Figure 5B:
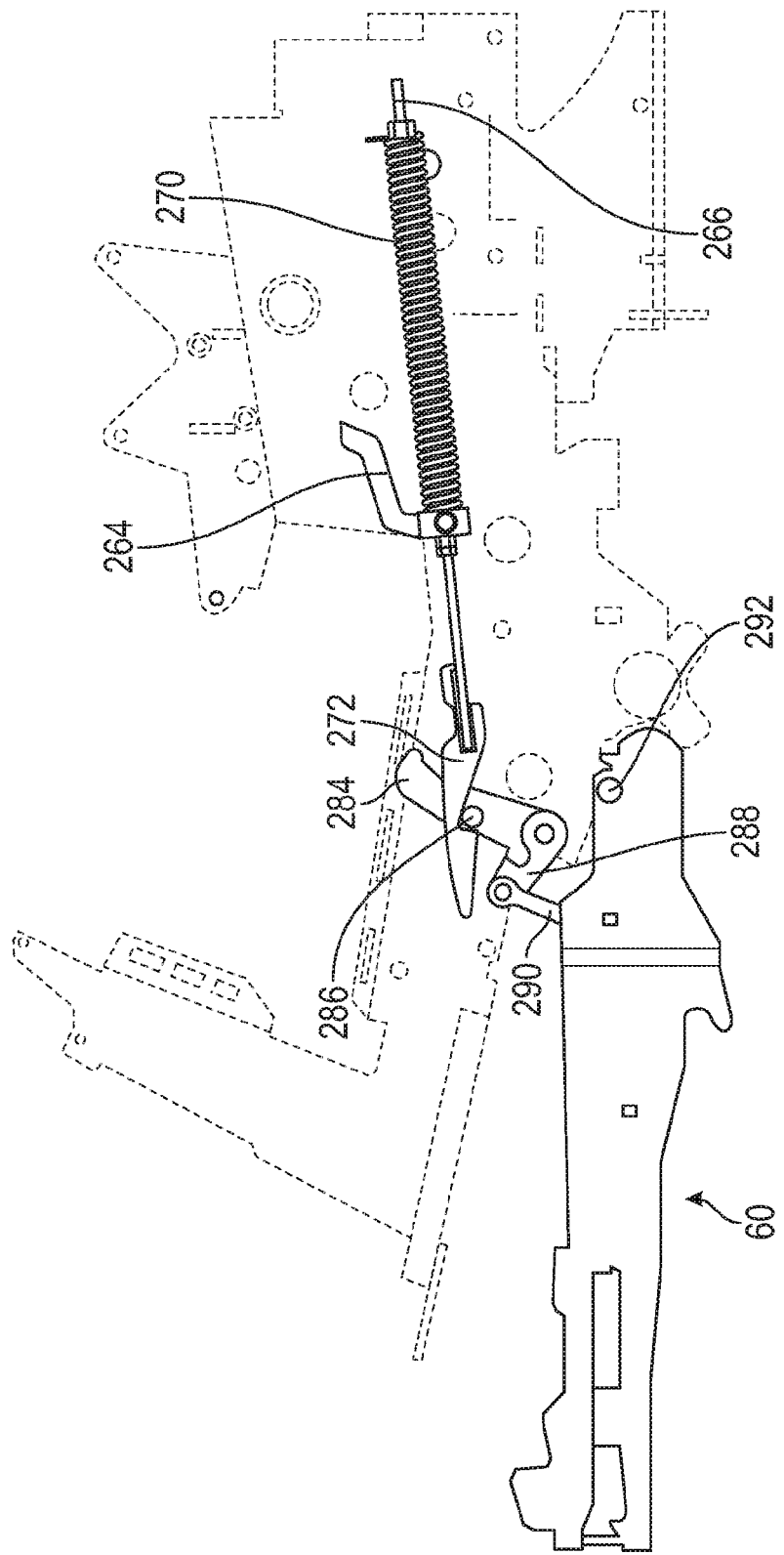
Figure 5C:
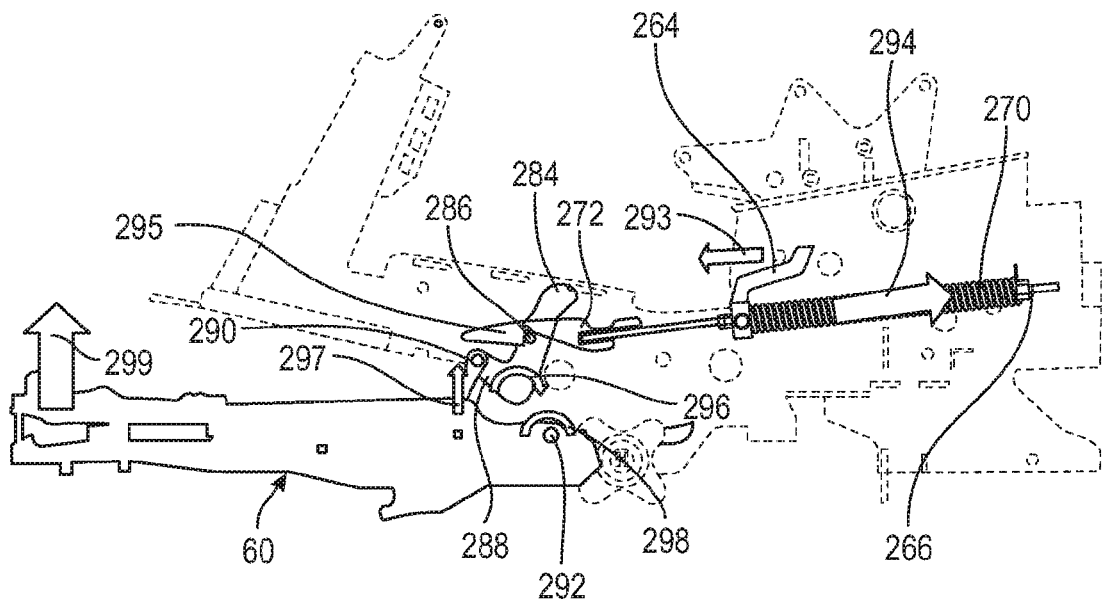
Figure 5D:
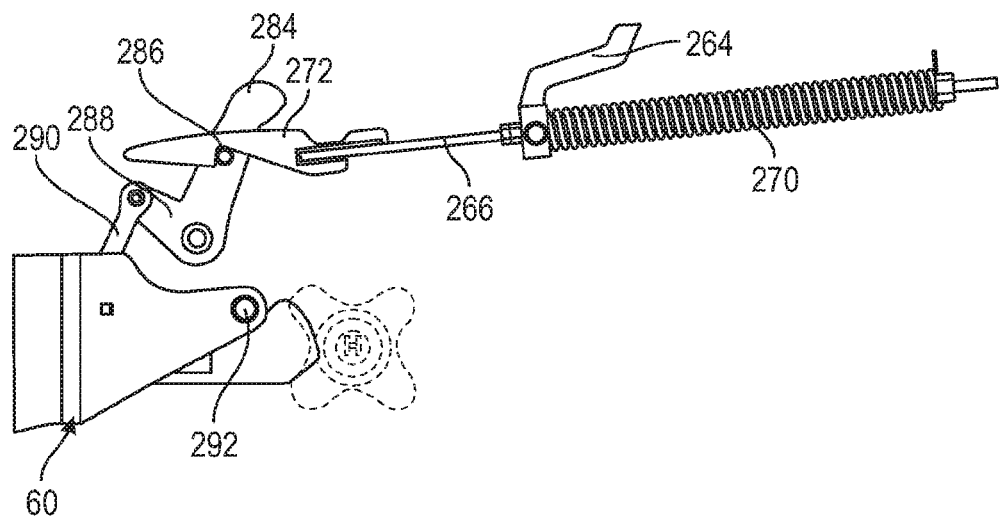

The weight transfer function described above may be employed by an operator while sitting in the seat 20 of the riding lawn care vehicle 10. FIG. 5A illustrates a partially isolated view of various components of a weight transfer assembly 260 in accordance with an example embodiment. In this regard, much of the riding lawn care vehicle 10 has been stripped away in order to show the vehicle frame 262 and the components of the weight transfer assembly 260 so that the interaction between the weight transfer assembly 260, the equipment frame 60 and the vehicle frame 262 of the riding lawn care vehicle 10 can be better appreciated. FIGS. 5B to 5D show various side views to illustrate operation of the weight transfer assembly 260.

As shown in FIG. 5A, in order to enable a seated operator to actuate the weight transfer assembly 260 from the seat 20, a lever 264 may be provided to extend toward the seat 20 to be actuated by the seated operator. The lever 264 may be operably coupled to a cable or rod assembly 266 that is biased (e.g., via spring 270) to position an actuation hook 272 in a rest position. The actuation hook 272 may be moved out of the rest position and into an actuated position responsive to actuation of the lever 264. In this regard, the actuation hook 272 of the weight transfer assembly 260 may be operably coupled to a pivot assembly 280 of the weight transfer assembly 260 to selectively cause rotation or pivoting of the pivot assembly 280 based on the position of the lever 264.

The pivot assembly 280 may include a pivot bar 282 that extends substantially perpendicular to a direction of extension of the rod assembly 266. The pivot bar 282 may also extend substantially perpendicular to the longitudinal centerline of the riding lawn care vehicle 10 and be disposed forward of the front wheels 34 of the riding lawn care vehicle 10. The pivot bar 282 may carry a lever arm 284 having a protrusion 286 (seen best in FIG. 5D) that interacts with the actuation hook 272. The pivot bar 282 may also include link arms 288 disposed at opposing ends thereof, and each of the link arms 288 may be operably coupled to a respective link 290 disposed on each opposing lateral side of the equipment frame 60. The equipment frame 60 may be pivotally mounted to the vehicle frame 262 of the riding lawn care vehicle at a pivot point 292, and may also be supported by the links 290. The lever arm 284 may be aligned with the actuation hook 272 to enable the actuation hook 272 to be shifted between the rest position and the actuated position to correspondingly rotate the pivot bar 282 when the lever 264 is actuated as described in greater detail below.

In this regard, FIG. 5B illustrates a side view of the weight transfer assembly 260 shown with the actuation hook 272 in the rest position. Meanwhile, FIG. 5C illustrates how various components of the weight transfer assembly 260 move when the actuation hook 272 is moved to the actuated position. In the rest position, the actuation hook 272 does not put any rearward pressure on the protrusion 286 of the lever arm 284. Accordingly, gravity may act on the equipment frame 60 to maintain the equipment frame 60 at a rest position supported by the links 290 and the pivot point 292 as shown in FIG. 5B. However, when the lever 264 is moved forward in the direction of arrow 293, the biasing force of spring 270 is overcome and the rod assembly 266 is moved rearward in the direction of arrow 294. This rearward movement of the rod assembly 266 causes the actuation hook 272 to also move rearward (as shown by arrow 295) and pull on the lever arm 284. The lever arm 284 will then pivot in the direction of arrow 296 about a pivot axis of the pivot bar 282 and correspondingly carry the links 290 upward in the direction of arrow 297. The equipment frame 60 then correspondingly pivots about the pivot point 292 as shown by arrow 298 to raise the distal end of the equipment frame 60 as shown by arrow 299.

The raising of the distal end of the equipment frame 60 (shown by arrow 299) places the equipment frame 60 in the weight transfer position, which will be described in greater detail below. However, it should be appreciated that by either releasing the lever 264 (or moving it rearward), the lever 264 will move in a direction opposite to the direction of arrow 293. The spring 270 will then be allowed to return the actuation hook 272 to the rest position, and movements of all components described above in reference to FIG. 5C will be opposite to the arrow directions shown in order to lower the distal end of the equipment frame 60 under force of gravity (in a direction opposite the direction of arrow 299). The equipment frame 60 will then be in a stable or rest position as well, which is the normal operating position of the equipment frame for the routine connecting or disconnecting of the equipment frame 60 to the cutting deck 50.

When the equipment frame 60 is in the normal operating position (i.e., not the weight transfer position), either the cutting deck 50 can be moved rearward toward the equipment frame 60 or the equipment frame 60 can be moved forward toward the cutting deck 50 to mate the equipment frame 60 to the attachment frame 52 as described above. Then, the latching assembly 100' of FIG. 6, or the latching assembly 100" of FIG. 7 can be used to affix the equipment frame 60 to the attachment frame 52 such that the cutting deck 50 is in the working position. However, when the equipment frame 60 is in the weight transfer position, the cutting deck 50 may be located forward (relative to the equipment frame 60) of the position of the cutting deck 50 in the working position, and the cutting deck can be rotated to the service position (shown in FIG. 8A). The latching assembly 100' or latching assembly 100" can then secure the cutting deck 50 to the equipment frame 60 in the respective positions as described in greater detail below. Thus, one latching assembly may be used to lock or otherwise secure the cutting deck 50 in both the service position and the working position while the ability to transition into the weight transfer position allows for a safe and easy transition into the service position while avoiding any sudden or unexpected movements of the cutting deck 50 during the transition.

Referring now to FIG. 6, the latching assembly 100' of an example will be described. In particular, the mating of the equipment frame 60 with the attachment frame 52 will be described according to an example embodiment. In this regard, as shown in FIG. 6A, the latching assembly 100' includes a pivot arm 300 and a latch member 310 on each opposing lateral side of the latching assembly 100'. The pivot arms 300 and latch members 310 are operably coupled to the respective guide rails 130 that are on the same side of the latching assembly 100'. The pivot arms 300 and the latch members 310 on the same side are also operably coupled to each other at a pivot coupling 320 defining a first pivot axis 322. Meanwhile, the latch members 310 are also pivotally coupled to the respective guide rail 130 on the same side at a second pivot axis 324. A latch operator 330 extends between opposing ones of the latch members 310, and a cross bar 332 extends between opposing ones of the pivot arms 300. The latch operator 330 can be lifted (i.e., in the direction of arrow 334) to cause the latch members 310 to pivot about the second pivot axis 324 as shown by arrow 336. The pivoting of the latch members 310 may then carry first pivot axis 322 upward and thereby lift the pivot arms 300. The latch operator 330 can then be pushed downward (i.e., in a direction opposite of the direction of arrow 334) to cause the latch members 310 to pivot in a direction opposite that shown by arrow 336 to lower the pivot arms 300. These movements may be conducted in connection with positioning the connection studs 146 within the positional adjustment slots 134 of respective ones of the guide rails 130 in the manner described below in reference to FIGS. 6B-6F. In this regard, FIGS. 6B-6F show the interaction between the guide rail 130 on one side of the riding lawn care vehicle 10 and connection stud 146 of the first rail 140. As shown in FIG. 6B, when the latching assembly 110' is in its normal or rest position, the pivot arm 300 is resting at its lowest position and the latch member 310 is pivoted rearward as far as possible (i.e., in the direction opposite arrow 336). The equipment frame 60 may be in the normal operating position (or rest position) and not be in the weight transfer position. The connection stud 146 may be moved (relatively speaking) toward the positional adjustment slot 134 and prepare to encounter a cam surface 340 of the latch member 310. As shown in FIG. 6C, when initial contact is made between the connection stud 146 and the cam surface 340, the cam surface 340 is forced to move the latch member 310 around the second pivot axis 324 in the direction shown by arrow 336. This pivoting of the latch member 310 carries the second pivot axis 322 upward as shown by arrow 334 as the point at which the latch member 310 is coupled to the pivot arm 300 is moved upward. The pivot arm 300 is therefore also carried upward and generally out of registration with the positional adjustment slot 134 such that the positional adjustment slot 134 is effectively unblocked or clear. The connection stud 146 therefore has freedom to move rearward within the positional adjustment slot 134 while the guide rail 130 on the right side of the riding lawn care vehicle 10 and the first rail 140 are substantially aligned and the cutting deck 50 can be moved rearward in the direction of arrow 350 until the connection stud 146 passes under a distal end (relative to the first pivot axis 322) of the pivot arm 300, as shown in FIG. 6D.

Figure 6A:
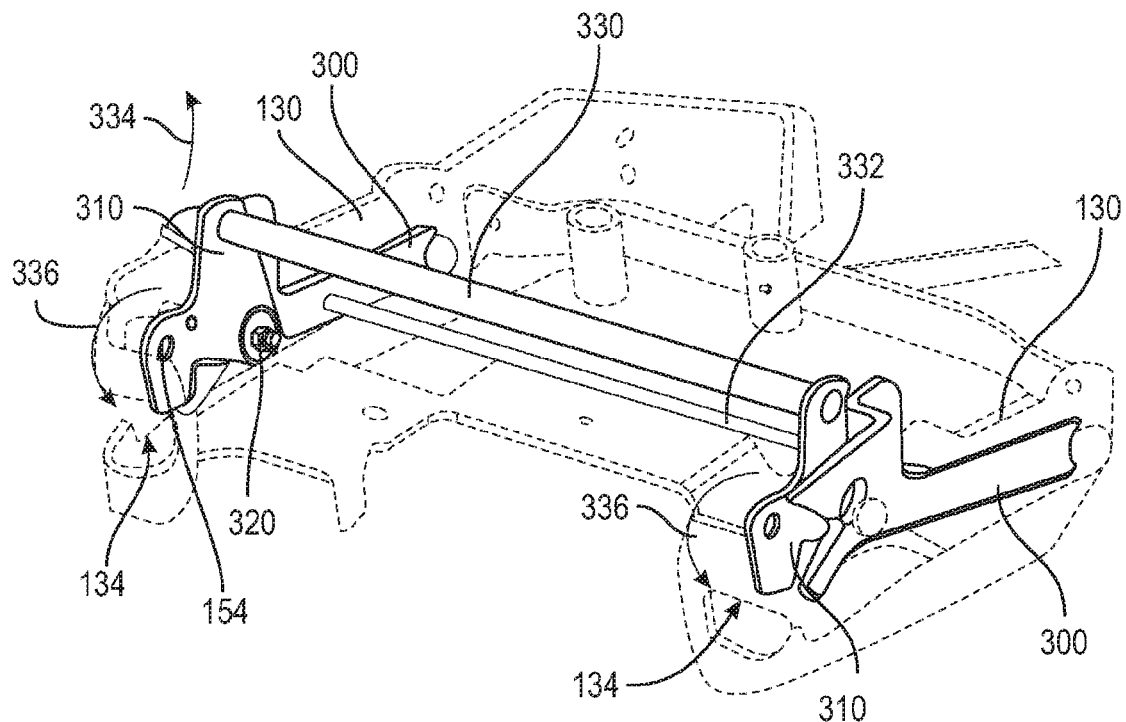
Figure 6B:
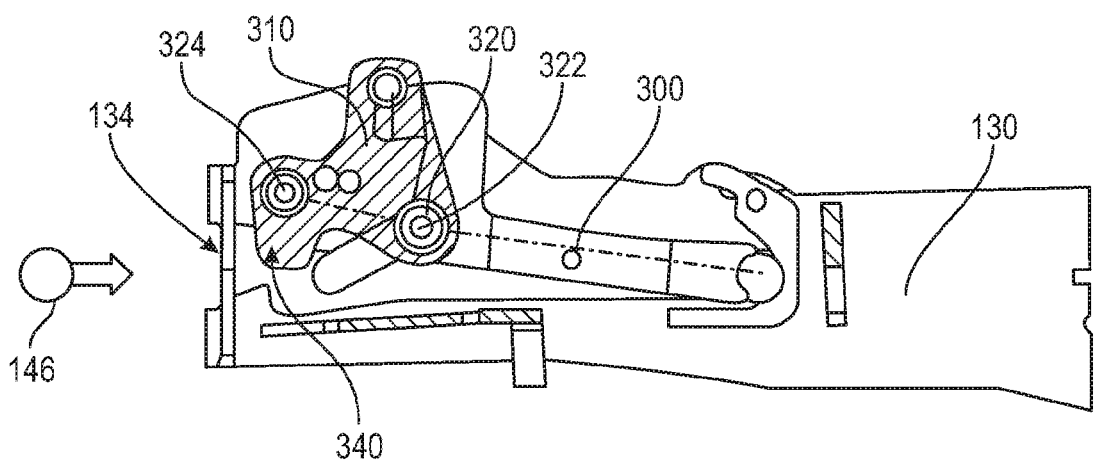
Figure 6C:
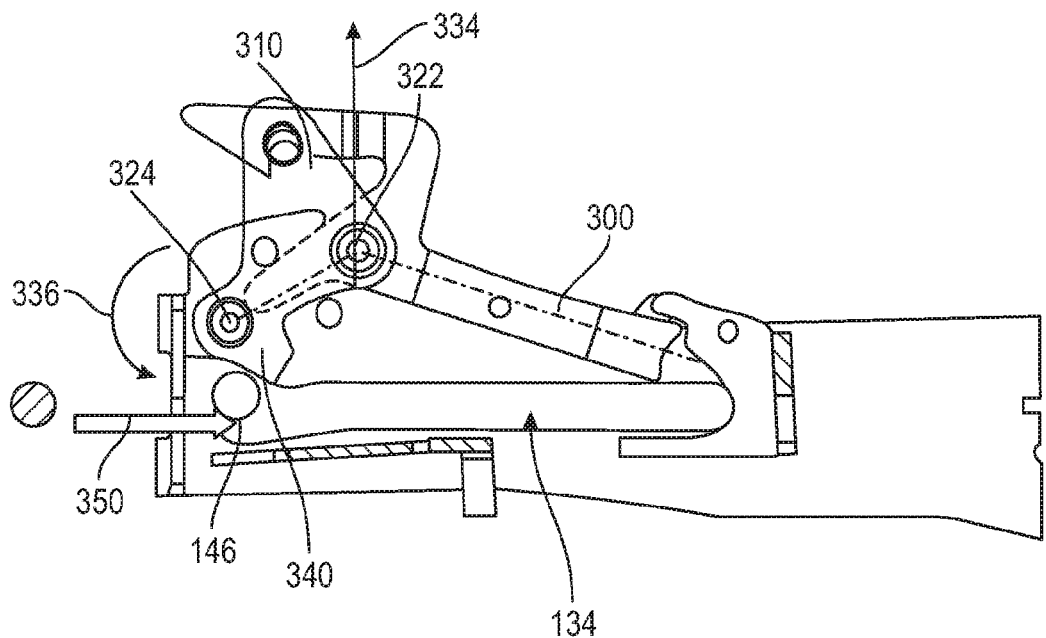
Figure 6D:
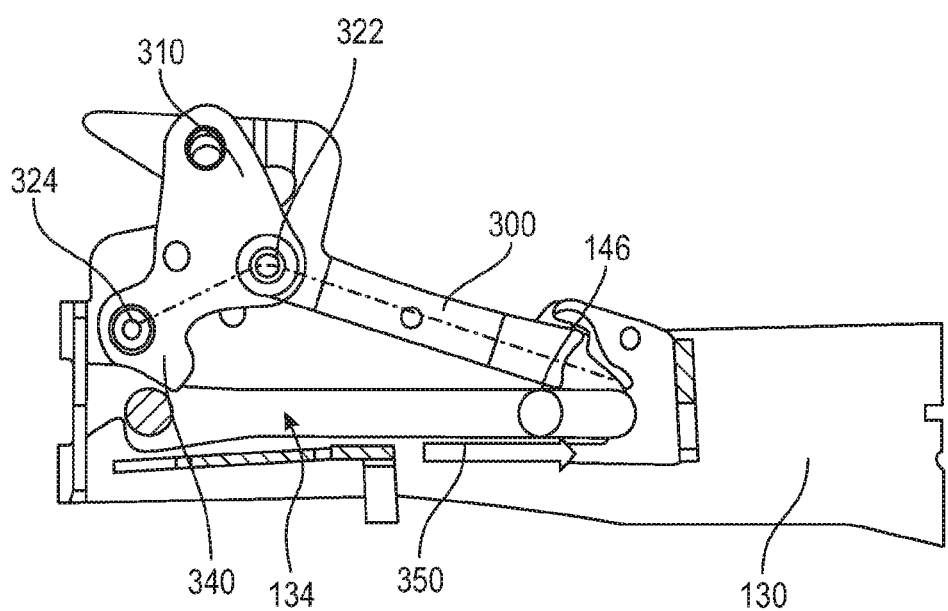
Figure 6E:
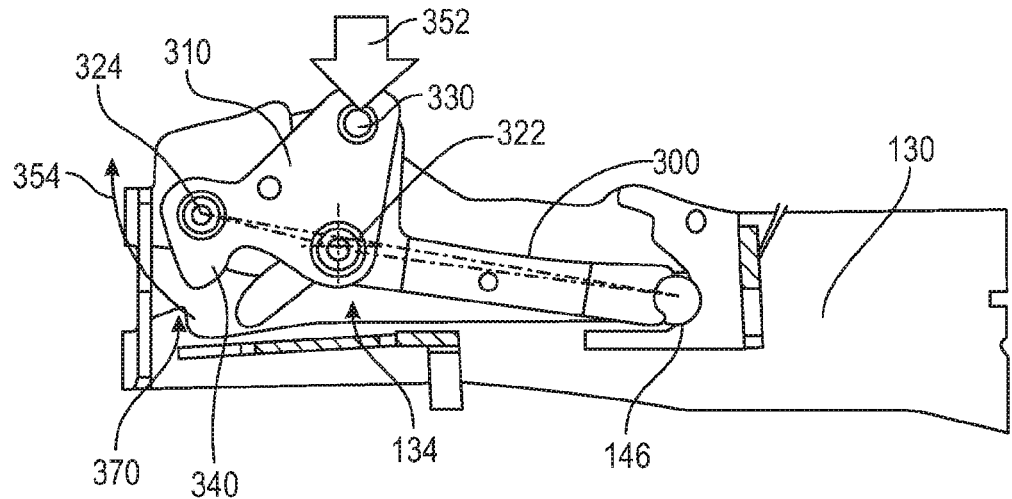

Transitioning to FIG. 6E, when the connection stud 146 is fully inserted into the positional adjustment slot 134, the latch operator 330 may be pushed down (in the direction of arrow 352) to cause the latch member 310 to pivot in the direction of arrow 354 and move the first pivot axis 322 downward while carrying the pivot arm 300 downward to be in registration with (or cover) the positional adjustment slot 134 and hold the connection stud 146 in place. FIG. 6E therefore represents the working position with the equipment frame 60 mated with and secured to the attachment frame 52.

Figure 6F:
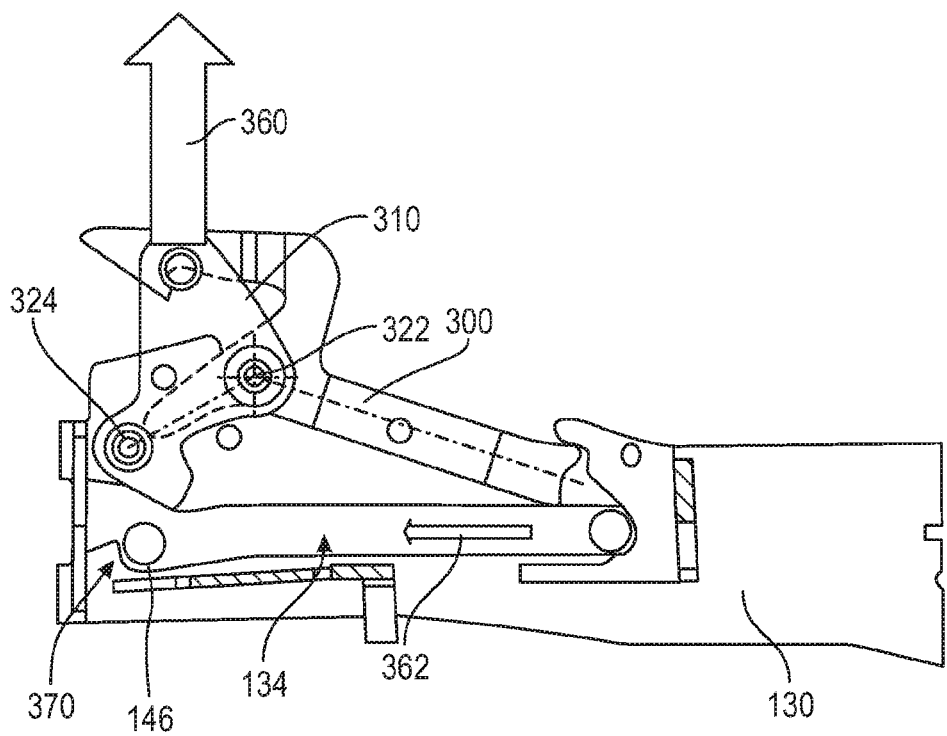
Figure 6G:
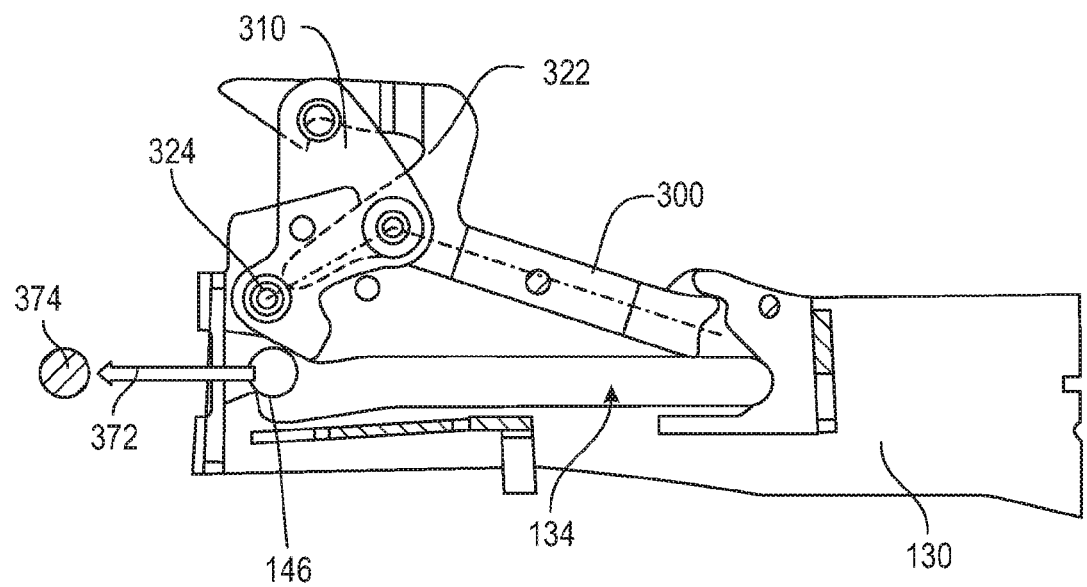
Figure 8A:
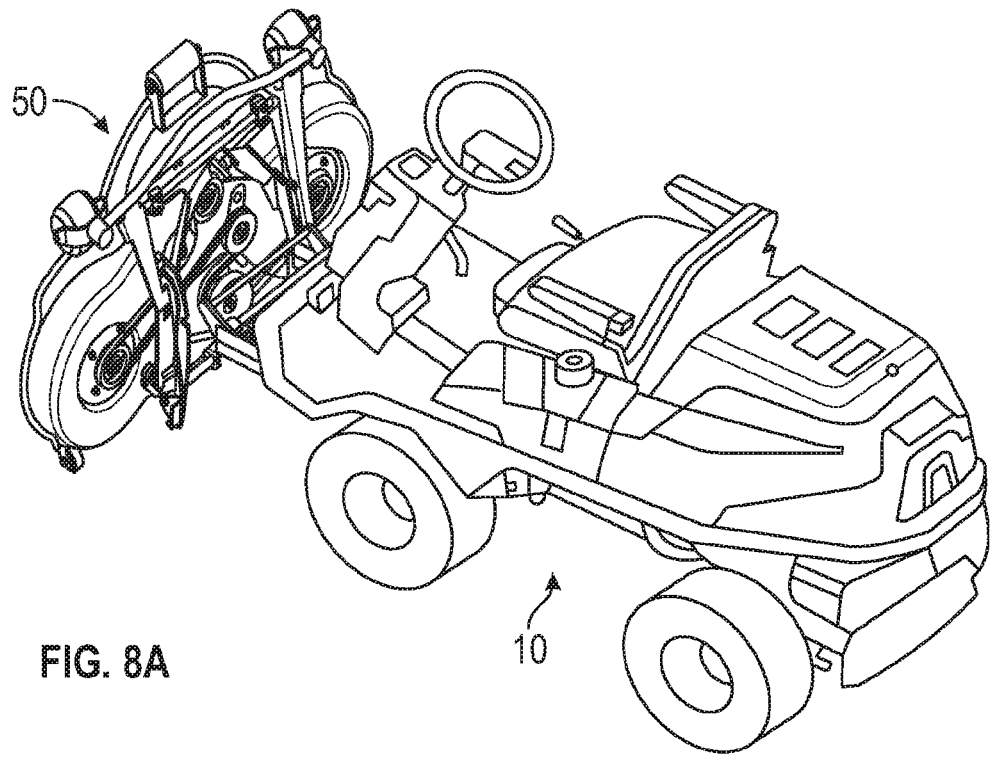

From the working position, the latch operator 330 can be lifted in the direction of arrow 360 as shown in FIGS. 6F and 6G. The pivot arm 300 and the latch member 310 may each move as described above in reference to FIGS. 6B and 6C to clear the positional adjustment slot 134 to permit withdrawal of the connection stud 146 in the direction of arrow 362. However, the ability of the connection stud 146 to withdraw fully from the positional adjustment slot 134 may be impacted by the state of the weight transfer assembly 260 as described above. In this regard, for example, if the weight transfer assembly 260 is in the weight transfer position, the equipment frame 60 will be pivoted upward as shown in FIG. 5C. The pivoting of the equipment frame 60 to the weight transfer position will cause a catch member 370 disposed proximate to the entrance to the positional adjustment slot 134 to catch the connection stud 146 and prevent further movement in the direction of arrow 362. While the connection stud 146 remains in contact with or otherwise proximate to the catch member 370, the latch operator 330 may be pushed downward (e.g., in the direction opposite the direction of arrow 360) to cause motion of the pivot arm 300 and latch member 310 as described above in connection with FIG. 6E, and the cam surface 340 may hold the connection stud 146 at its location proximate to the catch member 370. The cutting deck 50 may then be rotated or pivoted to the service position as shown in FIG. 8A while the cutting deck 50 remains in fixed connection with (and therefore under positive control with respect to) the equipment frame 60. No slippage or unexpected movement of the cutting deck 50, which would otherwise surprise or unexpectedly contact the operator, may be allowed to occur.

Meanwhile, if the equipment frame 60 is not in the weight transfer position, the connection stud 146 may be properly aligned such that casy removal of the connection stud 146 from the positional adjustment slot 134 may be accomplished. In this regard, FIG. 6G illustrates removal of the connection stud 146 from the positional adjustment slot 134. Notably, when the equipment frame 60 is not in the weight transfer position, the connection stud 146 passes over the top of the catch member 370 so that the connection stud 146 can be moved in the direction of arrow 372 to a withdrawn position 374.

The example of FIG. 6, provides a single latch (i.e., the latch operator 330) that is operable for locking and unlocking the cutting deck 50 in connection with the equipment frame 60 in both the working position and the service position. Moreover, in each position, the operation of the latch operator 330 results in a connection that clearly provides a feel to the operator that the cutting deck 50 is safely secured so that the operator can be very confident and assured of safety during use. The latching assembly 100' of FIG. 6 also allows interoperability with the weight transfer function to shift between attachment and removal versus attachment and transition to the service position by defining an assured path where control can be maintained during movement and in each distinct position achieved after such movement. Finally, the latching assembly 100' enables attaching and detaching of equipment (e.g., the cutting deck 50) without any extra handling steps or components. However, it should be appreciated that similar advantages could also or alternatively be provided by modified or different example structures. One such example will now be described in reference to FIG. 7.

Figure 7A:
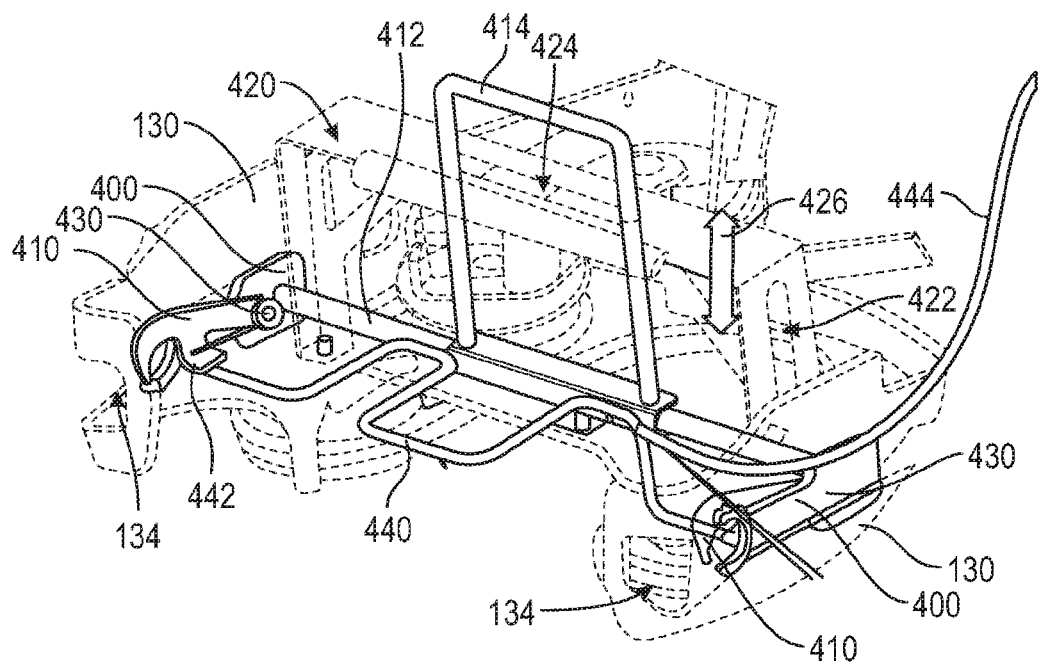

FIG. 7A illustrates a perspective view of a latching assembly 100" according to another example embodiment. The example of FIG. 7A may effectively swap out the latching assembly 100" for any previously described latching assembly, but structures of the other components may be substantially similar except as specifically described herein. Referring now to FIG. 7A, the latching assembly 100" may include a pivot arm 400 and a latch member 410 on each opposing side of the latching assembly 100" and proximate to respective guide rails 130. The pivot arms 400 may be operably coupled to each other via cross bar 412. An operating lever 414 may extend upwardly from the cross bar 412 in a direction substantially perpendicular to the direction of extension of the cross bar 412. The pivot arm 400 may be operably coupled to the guide rails 130 by a guide assembly 420. The guide assembly 420 may include vertical slots 422 through which the cross bar 412 passes, and a horizontal slot 424 through which the operating lever 414 passes. The cross bar 412 may slide upward and downward within the vertical slots 422 to correspondingly cause upward and downward movement of the operating lever 414 within the horizontal slot 424 as shown by double arrow 426.

The pivot arm 400 may also be operably coupled to the latch member 410 at a pivot point 430. The latch member 410 may pivot relative to the pivot arm 400 about the pivot point 430 such that distal ends of the latch member 410 and the pivot arm 400 can be moved farther apart from each other or closer to each other based on the direction and distance pivoted about the pivot point 430. In an example embodiment, the latch assembly 100" may also include a release latch 440 that is operable to lock or unlock the ability of the latch member 410 and pivot arm 400 to move relative to each other. During operation for attaching the cutting deck 50 in the working position, the service position, or during transition between the working position and the service position, the latch member 410 and the pivot arm 400 may cooperate to receive and hold the connection stud 146 to control the cutting deck 50 during the process of attachment or transitioning of the cutting deck 50 relative to the equipment frame 60 as described below.

In this regard, for example, the latch member 410 may include a cam surface 450 that is shaped to allow interaction with the connection stud 146 to move the latch member 410 about the pivot point 430 in the manner described below. This movement will effectively allow the pivot arm 400 and latch member 410 to cooperate to automatically catch the connection stud 146 and retain the connection stud 146 in a caught state until the release latch 440 is operated as described below.

Figure 7B:
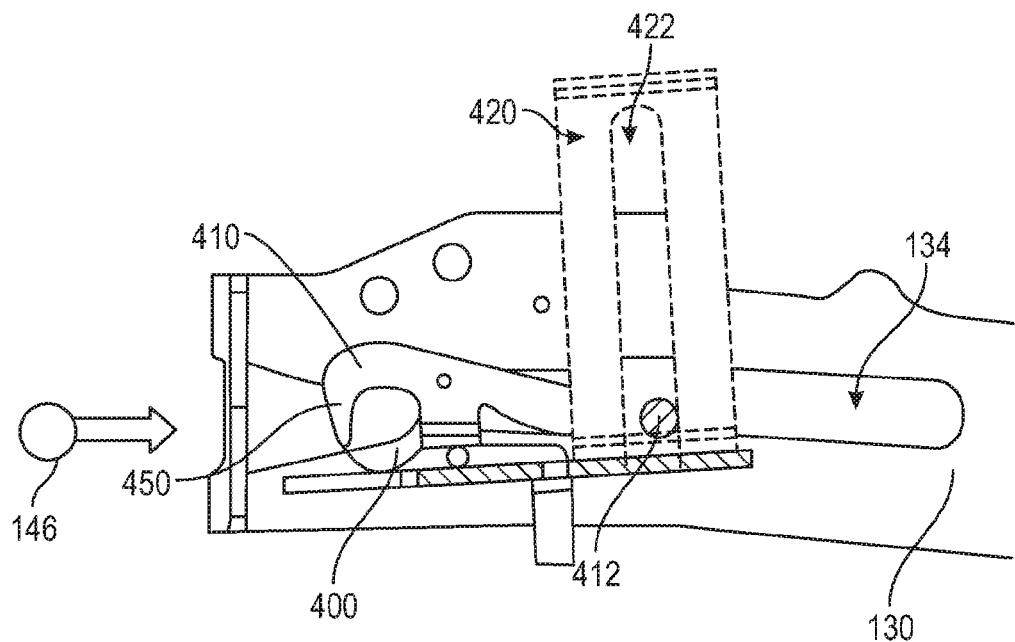
Figure 7C:
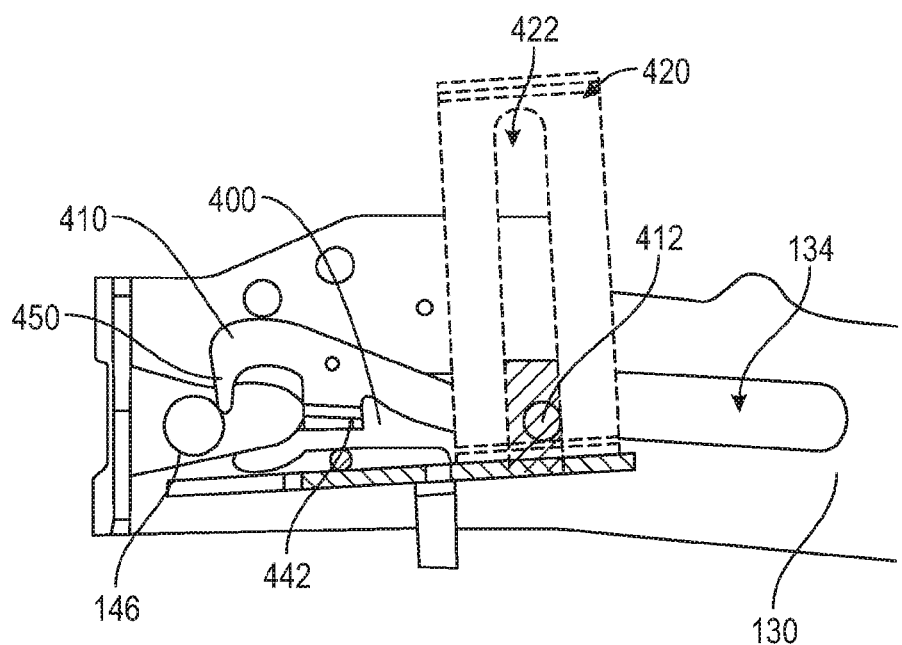

Referring now to FIG. 7B, the connection stud 146 may be moved rearward toward the positional adjustment slot 134 formed in the guide rail 130 similar to the manner described above. Alternatively, of course, the guide rail 130 could be moved forward toward the connection stud 146 for the same result. The weight of the latch member 410 may generally cause the latch member 410 to fall toward the pivot arm 400. However, in some cases, a spring or other biasing member may be used to draw the latch member 410 toward the pivot arm 400. In any case, when the connection stud 146 comes into contact with the cam surface 450 and continues to move rearwardly (i.e., away from a point of entry into the positional adjustment slot 134), as shown in FIG. 7C, the latch member 410 may be lifted or otherwise move in a direction show by arrow 460, as the latch member 410 pivots about the pivot point 430. When the connection stud 146 passes the cam surface 450, the latch member 410 may again fall (e.g., assisted by the spring or other biasing member) to clamp around the connection stud as shown in the dashed line representation of FIG. 7D.

Figure 7D:
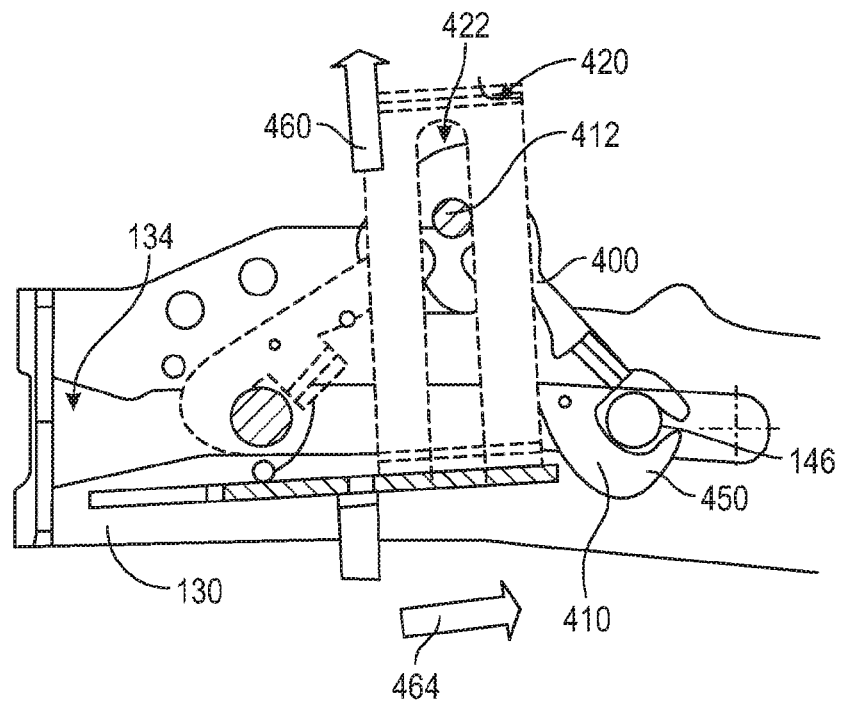
Figure 7E:
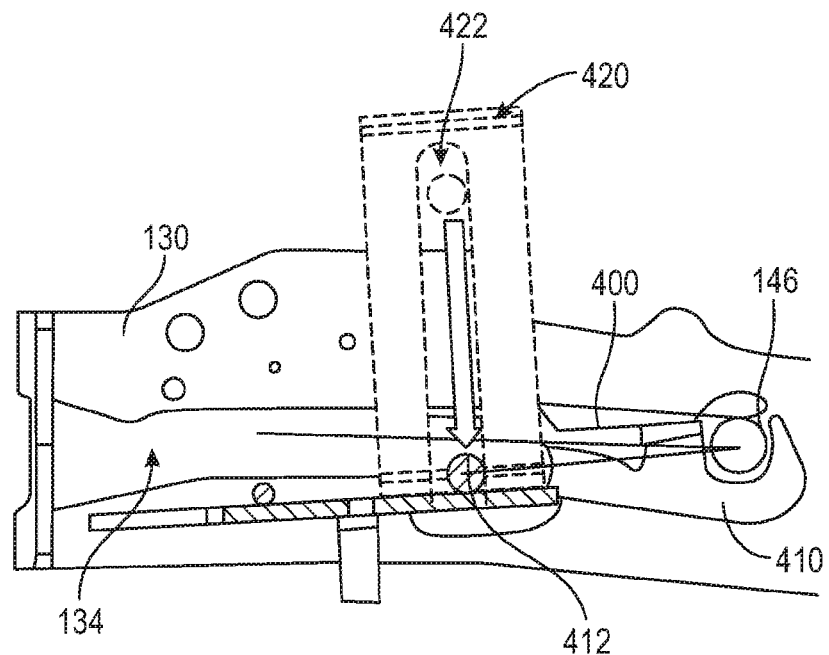

Continued rearward movement of the connection stud 146 (i.e., in the direction of arrow 464) may cause the cross bar 412 to slide up the vertical slots 422 as shown in FIG. 7D until an apex is reached when the connection stud 146 is aligned with the vertical slots 422. Thereafter, continued motion of the connection stud 146 in the direction of arrow 464 may cause downward motion of the cross bar 412. During this rearward movement of the connection stud 146, the latch member 410 continues to be drawn toward the pivot arm 400 to retain the connection stud 146 in the caught state between the pivot arm 400 and the latch member 410, and the relative positions of the pivot arm 400 and latch member 410 swap after the apex has been reached as shown in FIG. 7D. When the connection stud 146 reaches the distal end of the positional adjustment slot 134, the cross bar 412 may reach the bottom of the vertical slots 422 and the pivot arm 400 and the latch member 410 may be substantially aligned with the positional adjustment slot 134 as shown in FIG. 7E.

Movement of the connection stud 146 in a direction opposite of that shown by arrow 464 will tend to withdraw the connection stud 146 from the positional adjustment slot 134, and will cause a reversal of the motions described above until the connection stud 146 reaches the point shown in FIG. 7C. If weight transfer is desired due to a transition to the service position, the cutting deck 50 can be rotated to the service position while still being positively retained within the positional adjustment slot 134 due to being in the caught state between the latch member 410 and the pivot arm 400. However, if withdrawal of the connection stud 146 is desired to disconnect the cutting deck 50 from the equipment frame 60, then the release latch 440 can be operated to pivot the release latch 440 and lift the latch member 410 away from the pivot arm 400. A catch 442 may be disposed on the latch member 410 to be carried by the release latch 440 when the latch member 410 is in the position shown in FIG. 7C and the release latch 440 is pivoted. As shown in FIG. 7A, the release latch 440 may be operable by a cable 444 that is electrically or manually actuated (e.g., from the weight transfer assembly 260).

The example of FIG. 7, provides a single latch (i.e., the operating lever 414) that is operable for locking and unlocking the cutting deck 50 in connection with the equipment frame 60 in both the working position and the service position. Meanwhile, a second latch (i.e., the release latch 440) may be used to release equipment during detachment of the cutting deck 50. In both the service position and the working position, and at all points in between, the connection stud 146 is in a caught state and is positively retained. Thus, operation of the operating lever 414 results in a connection that clearly provides a feel to the operator that the cutting deck 50 is safely secured so that the operator can be very confident and assured of safety during use. The latching assembly 100" of FIG. 7 also allows interoperability with the weight transfer function to shift between attachment and removal versus attachment and transition to the service position by defining an assured path where control can be maintained during movement and in each distinct position achieved after such movement. Finally, the latching assembly 100" enables attaching and detaching of equipment (e.g., the cutting deck 50) without any extra handling steps or components.

Figure 8B:
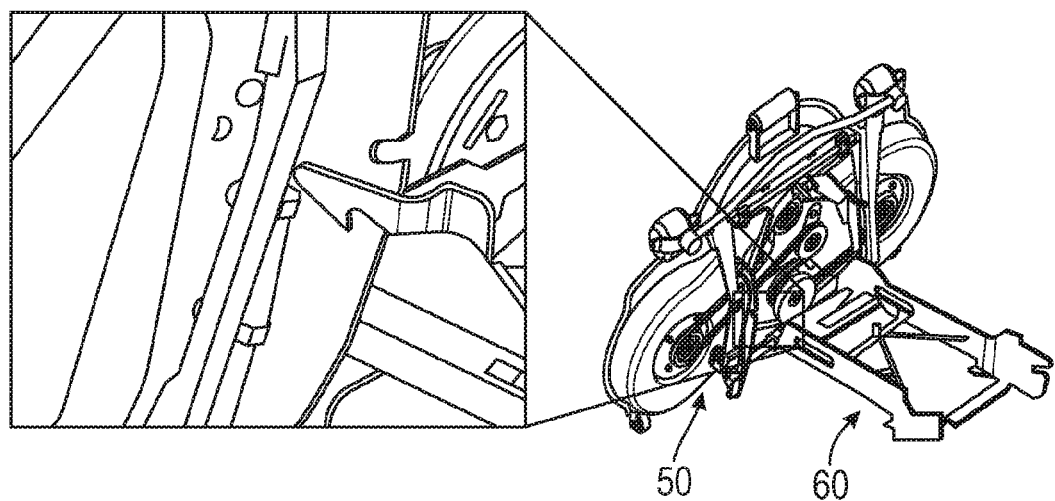
Figure 8C:
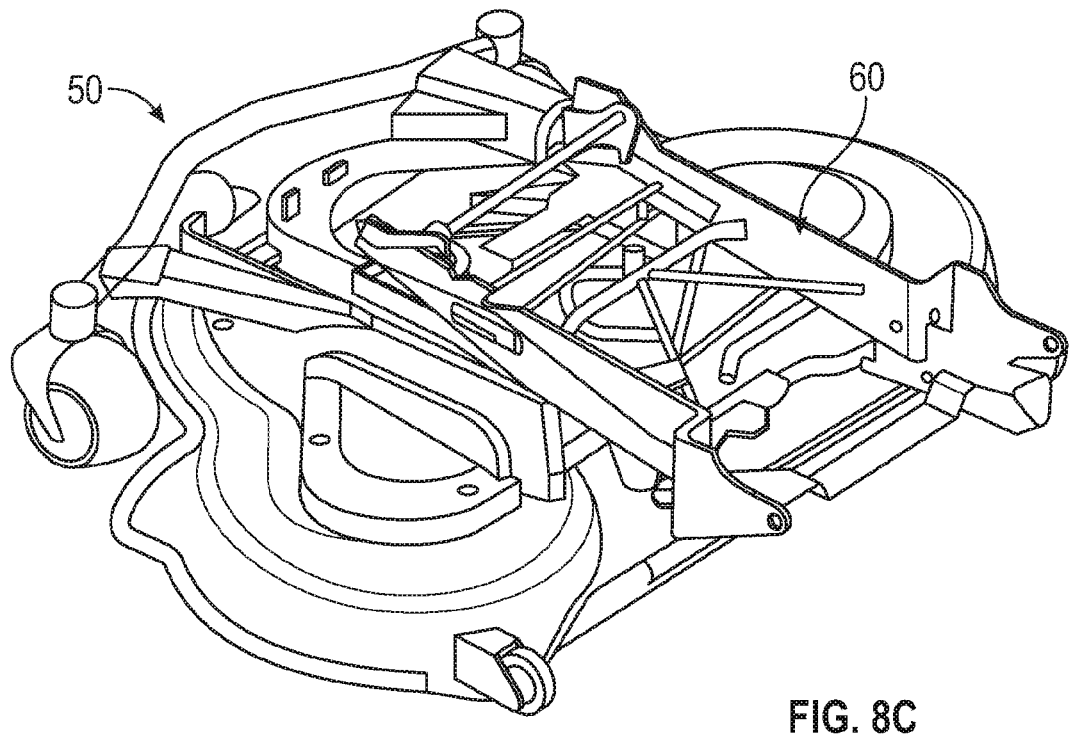
Figure 8D:
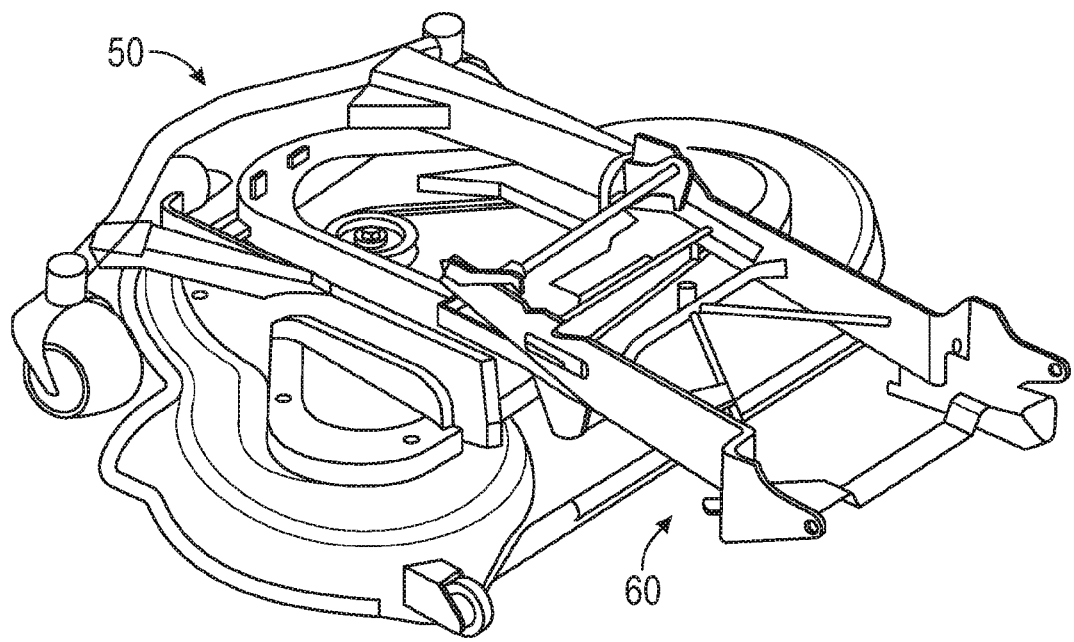

Accordingly, the cutting deck 50 can be rotated to the service position shown in FIGS. 8A and 8B safely, conveniently and easily. Moreover, the transition between the working position (shown in FIG. 8C) and the point at which the cutting deck 50 is ready to be rotated to the service position, which is shown in FIG. 8D, is also managed by defining an assured path that can be traversed with or without a weight transfer function in place to ensure that positive control of the cutting deck 50 is not lost.

When the cutting deck 50 is in the operational position, the cutting height can be adjusted via operation of the height adjustment assembly 150, which is shown in FIG. 9. The height adjustment assembly 150 includes portions on the cutting deck 50 and on the equipment frame 60, but such portions are operably coupled to each other seamlessly upon mating of the cutting deck 50 with the equipment frame 60. Thus, again, the operator need not employ tools or physically interact with any portion of the height adjustment assembly 150 in order to make connections between the portions of the height adjustment assembly 150 that are on the cutting deck 50 and those that are on the equipment frame 60. Instead, by placing the cutting deck 50 into the operational position, the corresponding portions of the height adjustment assembly 150 are brought into proximity of one another and are positioned for interaction with each other without further action by the operator. Actual adjustments to cutting height may be made by the operator using a lever disposed at the control panel 40. However, the making of such adjustments can be accomplished without the operator having to interact physically with the components of the height adjustment assembly 150 itself.

It should be appreciated that example embodiments of the present invention provide a new type of configuration for a front mounted riding lawn care vehicle. Example embodiments may provide a riding lawn care vehicle that includes a vehicle frame, a mobility assembly operably coupled to the vehicle frame, an equipment frame operably coupled to the vehicle frame such that the equipment frame extends forward of the mobility assembly, a steering assembly operably coupled to the mobility assembly to enable an operator positioned on the riding lawn care vehicle to provide steering control of the riding lawn care vehicle, a removable cutting deck comprising a cutting blade and configured to alternately connected and disconnected relative to the equipment frame, and a latching assembly. The latching assembly may be configured to enable the cutting deck to be transitioned between a service position and a working position and affix the cutting deck to the equipment frame in each of the service position and the working position. The vehicle structure and configuration may provide improved accessibility, versatility, cutting performance and/or the like for the riding lawn care vehicle.

In some cases, the vehicle may include additional optional features, structures or components, or the components described above may be augmented, modified or improved. Such augmentations, modifications or improvements can be added or subtracted in any combination. For example, in some cases, the vehicle may further include a weight transfer assembly. The weight transfer assembly may be configured to enable the equipment frame to be pivoted between a rest position and a weight transfer position. In an example embodiment, the weight transfer assembly may be remotely operable while the operator is seated. In some cases, the equipment frame may be pivotally coupled to the vehicle frame at a pivot point. The weight transfer assembly may include a lever configured to be operable to cause the equipment frame to pivot about the pivot point and raise an elevation of a distal end of the equipment frame. In an example embodiment, the weight transfer assembly may include an actuation hook configured to move from a rest position to actuate a lever arm and rotate links that lift the equipment frame. In some cases, the equipment frame may include guide rails having respective positional adjustment slots formed therein. The cutting deck may include connection studs configured to slide within the positional adjustment slots during transition of the cutting deck between the service position and the working position. In an example embodiment, the latching assembly may include a pivot arm and a latch member pivotally coupled to each other. The pivot arm and the latch member may cooperate with each other to affix the cutting deck to the equipment frame in each of the service position and the working position. In an example embodiment, the latching member may include a cam surface configured to cause the latching member to pivot relative to the pivot arm responsive to contact with one of the connection studs. In some cases, the cam surface may be configured to lock the one of the connection studs in a fixed location within a respective one of the positional adjustment slots in the service position responsive to the equipment frame being disposed in a weight transfer position. In an example embodiment, the latching member may be drawn toward the pivot arm by a biasing member such that the one of the connection studs is retained between the latching member and the pivot arm during a transition between the service position and the working position. In some cases, a release latch may be operably coupled to the latching member to separate the latching member from the pivot arm when the equipment frame is not in the weight transfer position and the cutting deck is positioned for rotation into the service position. In an example embodiment, the release latch may be configured to be inoperable while the equipment frame is in the weight transfer position. In some cases, the latch member may include a catch, and the catch may be lifted by the release latch responsive to operation of the release latch when the equipment frame is not in the weight transfer position. In an example embodiment, the latching assembly may include a guide assembly configured to retain a cross bar extending between respective instances of the pivot arm in vertical slots, and an operating lever may extend from the cross bar through a horizontal slot of the guide assembly. In some cases, the pivot arm may be configured to move away from a respective one of the positional adjustment slots responsive to the latching member pivoting to enable the connection stud to move to a distal end of the respective one of the positional adjustment slots. In an example embodiment, the pivot arm may be configured to lock the connection stud at the distal end of the respective one of the positional adjustment slots responsive to downward movement of a latch operator. In some cases, the latching assembly may include a latch operator that is alternately moved in an upward direction or downward direction to pivot the latching member relative to the pivot arm. Movement of the latch operator in the upward direction enables a transition of the cutting deck between a service position and a working position, and movement of the latch operator in the downward direction locks the cutting deck in the service position or the working position. In an example embodiment, the latching assembly may include an operating lever that is alternately moved in an upward direction or downward direction to accommodate pivoting of the latching member with the pivot arm responsive to motion of the one of the connection studs in the respective one of the positional adjustment slots.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A riding lawn care vehicle comprising:
a vehicle frame;
a mobility assembly operably coupled to the vehicle frame;
an equipment frame operably coupled to the vehicle frame, wherein the equipment frame extends forward of the mobility assembly;
a steering assembly operably coupled to the mobility assembly to enable an operator positioned on the riding lawn care vehicle to provide steering control of the riding lawn care vehicle;
a removable cutting deck comprising a cutting blade and configured to be alternately connected and disconnected relative to the equipment frame; and
a latching assembly configured to enable the cutting deck to be transitioned between a service position and a working position and to affix the cutting deck to the equipment frame in each of the service position and the working position,
wherein the equipment frame comprises guide rails having respective positional adjustment slots formed therein, and wherein the cutting deck comprises connection studs configured to slide within the respective positional adjustment slots during transition of the cutting deck between the service position and the working position, and wherein the riding lawn care vehicle further comprises a weight transfer assembly, and wherein the weight transfer assembly comprises an actuation hook configured to move from a rest position to actuate a lever arm and rotate links that lift the equipment frame.

2. The riding lawn care vehicle of claim 1, wherein the weight transfer assembly being is configured to enable the equipment frame to be pivoted between a rest position and a weight transfer position.

3. The riding lawn care vehicle of claim 2, wherein the weight transfer assembly is remotely operable while the operator is seated.

4. The riding lawn care vehicle of claim 2, wherein the equipment frame is pivotally coupled to the vehicle frame at a pivot point, and wherein the weight transfer assembly comprises a lever configured to be operable to cause the equipment frame to pivot about the pivot point and raise an elevation of a distal end of the equipment frame.

5. The riding lawn care vehicle of claim 1, wherein the latching assembly comprises a pivot arm and a latch member pivotally coupled to each other, and wherein the pivot arm and the latch member cooperate with each other to affix the cutting deck to the equipment frame in each of the service position and the working position.

6. The riding lawn care vehicle of claim 5, wherein the latching member comprises a cam surface configured to cause the latching member to pivot relative to the pivot arm responsive to contact with one of the connection studs.

7. The riding lawn care vehicle of claim 6, wherein the cam surface locks the one of the connection studs in a fixed location within a respective one of the positional adjustment slots in the service position responsive to the equipment frame being disposed in a weight transfer position.

8. The riding lawn care vehicle of claim 6, wherein the latching member is drawn toward the pivot arm by a biasing member such that the one of the connection studs is retained between the latching member and the pivot arm during a transition between the service position and the working position.

9. The riding lawn care vehicle of claim 8, wherein a release latch is operably coupled to the latching member to separate the latching member from the pivot arm when the equipment frame is not in the weight transfer position and the cutting deck is positioned for rotation into the service position.

10. The riding lawn care vehicle of claim 9, wherein the release latch is configured to be inoperable while the equipment frame is in the weight transfer position.

11. The riding lawn care vehicle of claim 10, wherein the latch member comprises a catch, and wherein the catch is lifted by the release latch responsive to operation of the release latch when the equipment frame is not in the weight transfer position.

12. The riding lawn care vehicle of claim 8, wherein the latching assembly comprises a guide assembly configured to retain a cross bar extending between respective instances of the pivot arm in vertical slots, and wherein an operating lever extends from the cross bar through a horizontal slot of the guide assembly.

13. The riding lawn care vehicle of claim 6, wherein the pivot arm is configured to move away from a respective one of the positional adjustment slots responsive to the latching member pivoting to enable the connection stud to move to a distal end of the respective one of the positional adjustment slots.

14. The riding lawn care vehicle of claim 13, wherein the pivot arm is configured to lock the connection stud at the distal end of the respective one of the positional adjustment slots responsive to downward movement of a latch operator.

15. The riding lawn care vehicle of claim 5, wherein the latching assembly comprises a latch operator that is alternately moved in an upward direction or downward direction to pivot the latching member relative to the pivot arm, wherein movement of the latch operator in the upward direction enables a transition of the cutting deck between a service position and a working position, and movement of the latch operator in the downward direction locks the cutting deck in the service position or the working position.

16. The riding lawn care vehicle of claim 5, wherein the latching assembly comprises an operating lever that is alternately moved in an upward direction or downward direction to accommodate pivoting of the latching member with the pivot arm responsive to motion of the one of the connection studs in the respective one of the positional adjustment slots.

17. A latching assembly for operably coupling a cutting deck to an equipment frame of a riding lawn care vehicle, the latching assembly comprising:

a pivot arm, and a latch member, wherein the pivot arm and the latch member are pivotally coupled to each other, wherein the pivot arm and the latch member cooperate with each other to affix the cutting deck to the equipment frame in each of a service position and a working position, wherein the equipment frame comprises guide rails having respective positional adjustment slots formed therein, and wherein the cutting deck comprises connection studs configured to slide within the respective positional adjustment slots during transition of the cutting deck between the service position and the working position.

18. The latching assembly of claim 17, wherein the riding lawn care vehicle further comprises a weight transfer assembly, the weight transfer assembly being configured to enable the equipment frame to be pivoted between a rest position and a weight transfer position such that the cutting deck is affixed to the equipment frame in the working position when the equipment frame is in the rest position, and the cutting deck is movable to the service position when the equipment frame is in the weight transfer position.

* * * * *

UNITED STATES PATENT AND TRADEMARK OFFICE
CERTIFICATE OF CORRECTION

PATENT NO. : 12,114,597 B2  
APPLICATION NO. : 17/051547  
DATED : October 15, 2024  
INVENTOR(S) : Johan Bengtzohn et al.

It is certified that error appears in the above-identified patent and that said Letters Patent is hereby corrected as shown below:

In the Claims

In Column 19, Claim 2, Line 13, "assembly being is configured" should read -- assembly is configured --

Signed and Sealed this  
First Day of April, 2025

Coke Morgan Stewart  
*Acting Director of the United States Patent and Trademark Office*